United States Patent
Trichina et al.

(10) Patent No.: US 8,670,557 B2
(45) Date of Patent: *Mar. 11, 2014

(54) CRYPTOGRAPHIC SYSTEM WITH MODULAR RANDOMIZATION OF EXPONENTIATION

(75) Inventors: Elena Trichina, Munich (DE); Helena Handschuh, Paris (FR); Arnaud Boscher, Puteaux (FR)

(73) Assignee: Spansion LLC, Sunnyvale, CA (US)

( * ) Notice: Subject to any disclaimer, the term of this patent is extended or adjusted under 35 U.S.C. 154(b) by 1416 days.

This patent is subject to a terminal disclaimer.

(21) Appl. No.: 11/852,644

(22) Filed: Sep. 10, 2007

(65) Prior Publication Data

US 2009/0067617 A1 Mar. 12, 2009

(51) Int. Cl.
*H04K 1/00* (2006.01)

(52) U.S. Cl.
USPC ........ 380/28; 380/1; 380/29; 380/30; 380/44; 380/46; 380/277; 380/278; 380/285; 713/189; 708/100; 708/200; 708/250; 708/255; 708/490; 708/491

(58) Field of Classification Search
USPC ............. 380/1, 28–30, 44, 46, 277, 278, 285; 713/189; 708/100, 200, 250, 255, 708/490–491
See application file for complete search history.

(56) References Cited

U.S. PATENT DOCUMENTS

| | | | |
|---|---|---|---|
| 6,298,135 B1 * | 10/2001 | Messerges et al. | 380/1 |
| 7,639,808 B2 * | 12/2009 | Izu et al. | 380/255 |
| 2001/0010077 A1 * | 7/2001 | McGregor et al. | 713/174 |
| 2004/0267859 A1 * | 12/2004 | Fischer et al. | 708/606 |
| 2006/0010192 A1 * | 1/2006 | Fischer et al. | 708/620 |
| 2006/0059219 A1 * | 3/2006 | Koshy et al. | 708/491 |
| 2006/0093137 A1 * | 5/2006 | Izu et al. | 380/30 |
| 2007/0064930 A1 * | 3/2007 | Fischer | 380/28 |
| 2008/0025500 A1 * | 1/2008 | Izu et al. | 380/28 |
| 2008/0140739 A1 * | 6/2008 | Elbe et al. | 708/190 |
| 2008/0205638 A1 * | 8/2008 | Al-Gahtani et al. | 380/30 |
| 2009/0003607 A1 * | 1/2009 | Aciicmez et al. | 380/277 |

FOREIGN PATENT DOCUMENTS

WO 9852319 A1 11/1998
WO 2006103341 A1 10/2006

OTHER PUBLICATIONS

Bodo Moller, "Algorithm for Multi-exponentiation",Springer-Verlag, Berlin Heidelberg 2001, pp. 165-180.*

(Continued)

*Primary Examiner* — Luu Pham
*Assistant Examiner* — Canh Le
(74) *Attorney, Agent, or Firm* — Turocy & Watson, LLP

(57) ABSTRACT

Systems and/or methods that facilitate secure electronic communication of data are presented. A cryptographic component facilitates securing data associated with messages in accordance with a cryptographic protocol. The cryptographic component includes a randomized exponentiation component that facilitates decryption of data and generation of digital signatures by exponentiating exponents associated with messages. An exponent is divided into more than one subexponent at an exponent bit that corresponds to a random number. Exponentiation of the first subexponent can be performed based on a left-to-right-type of exponentiation algorithm, and exponentiation of the second subexponent can be performed based on a right-to-left square-and-multiply-type of exponentiation algorithm. The final value is based on the exponentiations of the subexponents and can be decrypted data or a digital signature, which can be provided as an output.

19 Claims, 14 Drawing Sheets

(56) References Cited

OTHER PUBLICATIONS

Christopher Clavier and Marc Joye, "Universal Exponentiation Algorithm A First Step towards Provable SPA-Resistance," Springer-Verlag, Berlin Heidelberg 2001, pp. 300-308.*
Elena Trichina and Antonio Bellezza, "Implementation of Elliptic Curve Cryptography with Built-in Counter Measures against Side Channel Attacks," Springer-Verlag, Berlin Heidelberg 2003, pp. 98-113.*
Kouichi Itoh, Tetsuya Izu, and Masahiko Takenaka, "Improving the Randomized Initial Point Countermeasure Against DPA," Springer-Verlag, Berlin Heidelberg 2006, pp. 459-469.*
Chih-Ming, "On the Research of Power Analysis and Countermeasure of RSA Implementations," Jul. 17, 2006, pp. 1-77.*
Marc Joye and Sung-Ming Yen, "The Montgomery Powering Ladder", Springer-Verlag, 2003, pp. 291-302.*
Boneh, et al. "On the Importance of Eliminating Errors in Cryptographic Computations," Fumy, W., ed.: Advancesin Cryptology—EUROCRYPT '97, vol. 1233 of Lecture Notes in Computer Science, Springer, 1997. Last accessed Apr. 16, 2007, 17 pages.
Arnaud Boschner, et al. "CRT RSA Algorithm Protected Against Fault Attacks," Workshop in Information Security Theory and Practices, 2007: Smart Cards, Mobile and Ubiquitous Computing Systems. LNCS, vol. 4462, pp. 237-252, Springer-Verlag 2007. Last accessed Jul. 11, 2007, 15 pages.
Ciet, et al. "Practical Fault Countermeasures for Chinese Remaindering Based RSA," Workshop on Fault Diagonosis and Tolerance in Cryptography—FDTC '05, 2005. Last accessed Apr. 17, 2007, 18 pages.
Fumaroli, et al. "Blinded Fault Resistant Exponentiation," Workshop on Fault Diagnosis and Tolerance in Cryptography—FDTC '06, http://eprint.iacr.org, 2005. Last accessed Apr. 17, 2007, 9 pages.
Giraud. "Fault Resistance RSA Implementation," Workshop on Fault Diagnosis and Tolerance in Cryptography—FDTC '05, 2005. Last accessed Apr. 17, 2007, 88 pages.
Kocher. "Timing Attacks on Implementation of Diffie-Hellman, RSA, DSS, and Other Systems," Advances in Cryptology—FDTC '96, vol. 1109 if Lecture Notes in Computer Science, 1996. Last accessed Apr. 17, 2007, 10 pages.
Kocher, et al. "Differential Power Analysis," Advances in Cryptology—CRTYO '99, vol. 1666 of Lecture Notes in Computer Science. Last accessed Apr. 17, 2007, 10 pages.
Yen, et al. "Checking Before Output May Not Be Enough Against Fault-Based Cryptanalysis," IEEE Transactions on Computers 49, 2000. Last accessed Apr. 17, 2007, 5 pages.
E. Trichina, et al. "Implementation of Elliptic Curve Cryptosystems with build-in countermeasures against side-channel attacks". In Cryptographic Hardware and Embedded Systems (CHES'02). Lecture Notes in Computer Science, vol. 2523 (2002).
Stamatis Karnouskos, et al. Mobile Payment: A Journey Through Existing Procedures and Standardization Initiatives, IEEE Communication Surveys, vol. 6, No. 4, 2004, p. 44-66. http://www.comsoc.org/livepubs/surveys/public/2004/oct/index.html. Last accessed Feb. 3, 2008, 23 pages.
Nina Kreyer, et al. Characteristics of Mobile Payment Procedures, M-Services, 2002. http://sunsite.informatik.rwth-aachen.de/Publications/CEUR-WS/Vol-61/paper1.pdf. Last accessed Feb. 3, 2008, 13 pages.
K. Linck, et al. Security Issues in Mobile Payment from the Customer View Point. In: Proc. 14th Int. European Conf. on Information Systems (ECIS), Goeteborg, Sweden, 2006. MPRA Paper No. 2923, posted Nov. 7, 2007. http://mpra.ub.uni-muenchen.de/2923/1/MPRA_paper_2923.pdf. Last accessed Feb. 3, 2008, 12 pages.
Risks and Threads Analysis and Security Best Practices. Mobile 2-Way Messaging Systems, v 1.0, 2002. http://www.mobilepaymentforum.org/documents/Risk_and_Threats_Analysis_and_Security_Best_Practices_Mobile_2_Way_Messaging_December_2002.pdf. Last accessed Feb. 3, 2008, 49 pages.
Jan Ondrus, et al. A Disruption Analysis in the Mobile Payment Market. Proceedings of the 38th Hawaii International Conference on System Sciences—2005. 0-7695-2268-8/05. http://csdl2.computer.org/comp/proceedings/hicss/2005/2268/03/22680084c.pdf. Last accessed Feb. 3, 2008, 10 pages.
Antti Partanen, et al. FINEID S1—Electronic ID Application, v. 2.1, Population Register Center of Finland, Helsinki, Finland, 2004. http://www.vrk.fi/vrk/fineid/files.nsf/files/4A6480742C01D98BC2257054002A1D23/$file/S1v21.pdf. Last accessed Feb. 3, 2008, 34 pages.
WAP-210-WAPArch-20010712 Wireless Application Protocol Forum Ltd. (2001) Finland 24 pages.
WAP-260-WIM-20010712-a Wireless Identity Module, Part: Security (2001) 105 pages.
WAP-217-WPKI Wireless Application Protocol Public Key Infrastructure (2001) 46 pages.
3GPP Specification Detail https://www.3gpps.org/ftp/Spec/html/1114.htm last viewed Feb. 8, 2008, 3 pages.
The Java Community Process (JRSs):Java Specification requests http://www.jcp.org/en/jrs/detail?id=177 last viewed Feb. 8, 2008, 5 pages.
Mobile Transactions—SMS Payment for Your Web Site http://www,mobiletransactions.org/ last viewed Feb. 8, 2008, 1 page.
Mobey Forum http://www.mobeyforum.org/ last viewed Feb. 8, 2008, 1 page.
Niina Mallat, et al. Merchant Adoption of Mobile Payment Systems. Proceedings of the International Conference on Mobile Business (ICMB'05), 0-7695-2367-6/05 IEEE. http://ieeexplore.ieee.org/iel5/9999/32116/01493631.pdf?tp=&arnumber=1493631&isnumber=32116. Last accessed Feb. 22, 2008, 7 pages.
Seema Nambiar, et al. Analysis of Payment Transaction Security in Mobile Commerce. 0-7803-8819-4/0 IEEE http://ieeexplore.ieee.org/iel5/9790/30875/01431506.pdf?tp=&arnumber=1431506&isnumber=30875. Last accessed Feb. 22, 2008, 6 pages.
A. Vilmos, et al. SEMOPS: Design of a New Payment Service. Proceedings of the 14th International Workshop on Database and Expert Systems Applications (DEXA'03), 1529-4188/03 $17.00 © 2003 IEEE. http://ieeexplore.ieee.org/iel5/8719/27592/01232130.pdf?tp=&arnumber=1232130&isnumber=27592. Last accessed Feb. 22, 2008, 5 pages.

* cited by examiner

US 8,670,557 B2

CRYPTOGRAPHIC SYSTEM WITH MODULAR RANDOMIZATION OF EXPONENTIATION

BACKGROUND

Electronic communication of information has become commonplace. Today, information, including sensitive information, regarding individuals, businesses, and other entities, can be communicated electronically between devices. For example, computers, cellular phones, personal digital assistants (PDA), smart cards, and other electronic devices can be utilized to electronically communicate information between users. Further, devices, like smart cards, can be utilized to provide a digital signature or other authentication information that can reasonably identify the user of the smart card and can provide certain information regarding the user and/or can enable the user to sign electronic documents (e.g. legal documents) in a secure manner.

With regard to the electronic communication of sensitive information, encryption/decryption techniques can be utilized to protect such information from being accessed by undesired persons (e.g., attackers, hackers). For example, a public key-private key can be utilized to secure information electronically communicated between devices, where the intended recipient of the information can utilize a private key to facilitate decrypting the received information so that it can be perceived in a usable form. However, such undesired persons can be persistent in attempting to discover ways to overcome or bypass measures taken to secure data (e.g., encryption/decryption techniques). For example, attackers can attempt to collect side channel information (e.g., power consumption information, fault information, electromagnetic information) associated with a device when it is encrypting/decrypting information in order to learn the private key or other security measures utilized to secure the information. When such undesired persons gain unauthorized and undesired access to the information of a user, it can result in financial hardship, emotional hardship, and/or other harm to the user.

It is therefore desirable to maintain the security of information communicated electronically. Further, while countermeasures can be employed to minimize the risk of unauthorized access to information, it is desirable that such countermeasures be manageable on electronic devices, including portable electronic devices (e.g., cellular phones, smart cards).

SUMMARY

The following presents a simplified summary of the innovation in order to provide a basic understanding of some aspects described herein. This summary is not an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

The disclosed subject matter relates to systems and/or methods that facilitate securing information, such as information communicated electronically. In accordance with one aspect of the disclosed subject matter, a cryptographic component can be employed to encrypt and decrypt data to facilitate securing electronically communicated information, for example, with regard to communication of information associated with Rivest, Shamir and Adleman (RSA) cryptography. The cryptographic component can include a randomized exponentiation component that can generate and/or utilize a random number that can correspond with a position of a bit in an exponent and can be utilized to split or divide an exponent into two vectors at the corresponding bit position. When a message and/or exponent is received by the cryptographic component, the randomized exponentiation component can divide the exponent into two vectors at the exponent bit with a position that corresponds to the random number. The randomized exponentiation component can perform a first type of exponentiation on data with one vector and another type of exponentiation on the data with the other vector, and can compute a final value, based on a combination of both exponentiations, that can be provided as output (e.g. digital signature, decrypted message). For example, the first type of exponentiation can be left-to-right square-and-multiply exponentiation and the other type of exponentiation can be right-to-left square-and-multiply exponentiation (also referred to herein as right-to-left exponentiation or Russian Peasant exponentiation).

In accordance with one embodiment of the disclosed subject matter, given an exponent of m bits and a random bit number k between $bit_0$ and $bit_{m-1}$, the randomized exponentiation component can perform a first type of exponentiation (e.g., left-to-right) on data with a first vector scanning each exponent bit from k−1 to 0. That is, the first type of exponentiation can be performed from the exponent bit preceding the random bit k, and can scan each bit to the least significant bit (e.g. $bit_0$) in the exponent. The results of this exponentiation can be stored as partial results. The randomized exponentiation component can also perform a disparate type of exponentiation (e.g., Russian Peasant exponentiation) on the data with a second vector scanning each exponent bit from k to m−1, that is, scanning from random bit k to the most significant bit (e.g., $bit_{m-1}$) in the exponent. The partial results of the first type of exponentiation can be utilized as part of initial values for the disparate type of exponentiation. The value returned by the disparate type of exponentiation can be a final result, which can be provided as an output.

In accordance with another embodiment of the disclosed subject matter, given an exponent of m bits and a random bit number k that falls between $bit_0$ and $bit_{m-1}$, the randomized exponentiation component can perform a first type of exponentiation on the data with a first vector scanning each exponent bit from m−1 to k, that is, scanning inward from the most significant bit to the random bit k of the exponent. The results of this exponentiation can be stored as partial results. The randomized exponentiation component can also perform a disparate type of exponentiation on the data with a second vector scanning each exponent bit from 0 to k−1, that is, scanning inward from the least significant bit to the bit preceding the random bit k in the exponent. The results of the disparate type of exponentiation can be stored. The results of the first type of exponentiation and the results of the disparate type of exponentiation can be combined to yield a final result which can be provided as an output.

In accordance with an aspect of the disclosed subject matter, the randomized exponentiation component can employ a computation component that can be comprised of one or more computation subcomponents that can perform the respective computations associated with the first type of exponentiation and the disparate type of exponentiation. The first type of exponentiation and the disparate type of exponentiation can be performed independent of each other. As such, by utilizing more than one computation subcomponent, the randomized exponentiation component can perform the first type of exponentiation in parallel with the disparate type of exponentiation, which can yield results in a more time-efficient manner and can provide additional data security, as parallel operations can confuse an attacker attempting a side-channel attack (e.g., an attack based on power consumption, fault information, electromagnetic emission, etc.) to discover the exponent.

In accordance with other aspects of the disclosed subject matter, the cryptographic component can employ other countermeasures in conjunction with random exponent splitting and performing disparate types of exponentiation on distinct vectors of the split exponent. For example, since the first type of exponentiation and disparate type of exponentiation can be performed independent of each other, the respective exponentiations can be performed in an interleaved manner, such as by performing a dynamically determined and/or predetermined number of iterations related to first type of exponentiation, storing the partial results related thereto, then alternating to perform a dynamically determined and/or predetermined number of iterations related to disparate type of exponentiation and storing the partial results related thereto, and continuing to rotate between the respective exponentiations until the final result is reached. One advantage of employing such an interleaving extension is that it can provide additional data security. Other countermeasures can include utilizing an atomic version of computations (e.g., atomic version of the Russian Peasant algorithm) and/or the Montgomery Powering Ladder method, for example.

The following description and the annexed drawings set forth in detail certain illustrative aspects of the disclosed subject matter. These aspects are indicative, however, of but a few of the various ways in which the principles of the innovation may be employed and the disclosed subject matter is intended to include all such aspects and their equivalents. Other advantages and distinctive features of the disclosed subject matter will become apparent from the following detailed description of the innovation when considered in conjunction with the drawings.

DETAILED DESCRIPTION

Figure 1:
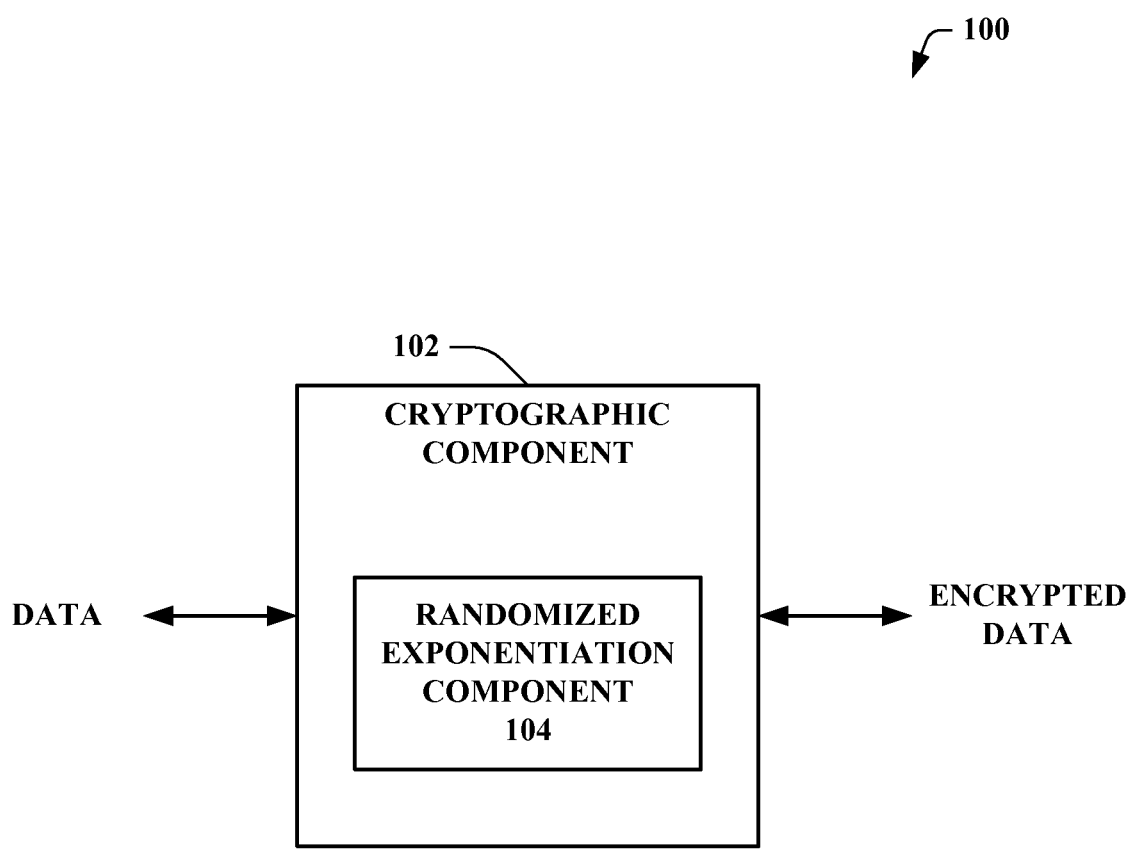
FIG. 1 illustrates a block diagram of a system that facilitates secure electronic communication of data in accordance with an aspect of the subject matter disclosed herein.

The disclosed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the disclosed subject matter may be practiced without these specific details. In other instances, well-known structures and devices are shown in block diagram form in order to facilitate describing the subject innovation.

Electronic communication of information, including sensitive information, has become commonplace. Security in the communication of such information is paramount, as such information can be related to personal information of a user, financial information of a user, etc. Cryptographic methods can be utilized to facilitate secure communication of data. For example, Rivest, Shamir and Adleman (RSA) cryptography and/or Elliptic Curve Cryptography (ECC) can be employed to encrypt/decrypt data and/or facilitate generation of a digital signature associated with a user, where public keys and private keys associated with a user can be utilized to facilitate encryption/decryption of the data. However, attackers can attempt to collect side-channel information (e.g., information related to power consumption, fault information, information related to electromagnetic output)) associated with the cryptography in order to decipher the data, exponent, and/or the cryptographic process.

Systems and/or methods are presented that facilitate secure electronic communication of data. A cryptographic component can be employed that can include a randomized exponentiation component that can utilize generated random numbers to split a cryptographic exponent into more than one vector (e.g. subexponent). The first vector can be used for performing modular exponentiation using a first type of binary exponentiation method (e.g., left-to-right square-and-multiply exponentiation (also referred to herein as left-to-right exponentiation)), and the second vector can be used for computations exponentiated using a second type of binary exponentiation method (e.g., right-to-left square-and-multiply exponentiation (also referred to herein as right-to-left exponentiation or Russian Peasant exponentiation)). A final value can be determined based on the results of the exponentiation with the first vector and the results of the exponentiation with the second vector. The final value, which can be in the form of decrypted data, encrypted data, and/or a digital signature, can be provided as an output, for example, to a host processor, interface (e.g., graphical user interface (GUI)), memory, and/or other component. The randomization of the exponentiation can be further enhanced by scanning the bits of the exponent in different ways (e.g., scanning from the randomly chosen bit of the exponent outward to the most significant bit and/or the least significant bit of the exponent), performing parallel exponentiation operations with the subexponents, interleaving the execution of exponentiation operations, and/or applying all or some of the above recursively to the exponentiation with the vectors. The randomization of the exponentiation can facilitate reducing or minimizing side-channel or fault attacks.

In accordance with another aspect of the disclosed subject matter, the randomized exponentiation component can also employ ECC to facilitate securing data. In the case of ECC, such exponentiation algorithms can be equivalently replaced with point multiplications. For example, traditional right-to-left and left-to-right exponentiation algorithms can be transposed into corresponding right-to-left and left-to-right point multiplication algorithms. As such, the randomized exponentiation system(s) and/or method(s), as further described herein, can be regular and/or modular exponentiation algorithms and/or point multiplication algorithms on an Elliptic Curve.

Turning to FIG. 1, illustrated is a system 100 that facilitates securing electronic communication of data associated with electronic communications in accordance with the disclosed subject matter. For example, system 100 can be associated with the electronic communication of information associated with RSA cryptography, ECC, Diffie-Hellman cryptography, Digital Signature Algorithm (DSA) cryptography, and/or Elliptic Curve DSA cryptography, for example. System 100 can include a cryptographic component 102 that can facilitate securing data in accordance with a cryptographic protocol(s), where such cryptographic protocol(s) can be associated with, for example, data encryption/decryption, digital signatures, key agreement, blind signatures, group or ring signatures, zero-knowledge, proofs of knowledge, authentication, digital cash, digital credentials, digital time stamping, multiparty computation (e.g., associated with auction bids), voting, etc. For example, the cryptographic component 102 can facilitate encrypting and decrypting data associated with electronic communications. As another example, the cryptographic component 102 can also facilitate generation of a digital signature that can be associated with a smart card, for example. The cryptographic component 102 can receive data and can encrypt it and provide the encrypted data, for example, to be stored in memory (not shown) or transmitted to another device or component (not shown). The cryptographic component 102 can also receive encrypted data and can facilitate decrypting such data and provide the decrypted data, for example, to a processor (not shown), interface (e.g., GUI) (not shown), memory, and/or other component, so that it can be perceived and/or utilized.

The cryptographic component 102 can include a randomized exponentiation component 104 that can facilitate randomizing the exponentiation (e.g., modular exponentiation) of received encrypted data to facilitate security of the data being decrypted, such as by securing the data and exponent from side-channel attacks (e.g., attacks based on simple power analysis (SPA), differential power analysis (DPA), differential fault analysis (DFA), and/or electromagnetic analysis (EMA)). The randomized exponentiation component 104 can employ countermeasures against such attacks, where such countermeasures can be based in part on the de-correlation of power curves from processed data by randomizing the way in which secret data (e.g., an exponent) is processed.

For instance, a message can be encrypted using a public key associated with a user. The encrypted message can be sent to the user, where the data encryption can facilitate securing the data so that other persons besides the user are not able, or are virtually unable, to access or decipher the original message. After the user receives the encrypted message, the user can utilize a private key, which can be associated with an exponent, and the cryptographic component 102 and/or the randomized exponentiation component 104 can utilize the private key and associated exponent to facilitate decrypting the encrypted message, so that the message can be perceived by the user in a usable form.

Given an m-bit exponent associated with a message, the randomized exponentiation component 104 can facilitate generating and/or receiving a randomly generated number between 0 and m−1 that can be associated with the position of the bit in the exponent that corresponds to the random number. The randomly generated number can be generated in a secure manner so as to reduce or minimize discovery of such number by an attacker. The randomized exponentiation component 104 can facilitate selecting the corresponding bit in the exponent based on the randomly generated number, and splitting the exponent into two vectors at the point of the selected bit of the exponent. For example, given an exponent d=[d(m−1), d(m−2), ..., d(0)] having m bits, and a random number k, where 0<k<m−1, the exponent d can be split into two vectors, d1 and d2, where d1=[d(k−1), d(k−2), ..., d(0)] and d2=[d(m−1), d(m−2), ..., d(k)].

The randomized exponentiation component 104 can employ a first type of exponentiation to exponentiate a message (e.g. data) with the first vector comprising the exponent, and another type of exponentiation to exponentiate the message with the other vector. A final result of the exponentiation can be determined based on the combination of the respective exponentiations. The cryptographic component 102 can provide such final result as an output, for example, as a decrypted message or a digital signature.

In accordance with one embodiment of the disclosed subject matter, the cryptographic component 102 can receive a message and an exponent that can be comprised of m bits (e.g., 1024 bits, 2048 bits, ... ) that can be associated with the message, and/or can receive a modulus. The randomized exponentiation component 104 can generate and/or receive a random number k that can have a value between 0 and m−1. The randomized exponentiation component 104 can select the bit in the exponent that corresponds to the random number k, and can split or divide the exponent into two vectors (e.g., subexponents) at the exponent bit having a position that corresponds to the random number k. The randomized exponentiation component 104 can perform a first type of exponentiation with a first vector (e.g. d1) by scanning it from $bit_{k-1}$ to $bit_0$. That is, the first type of exponentiation can be performed from the exponent bit preceding $bit_k$, and scanning outward to the least significant bit (LSB) in the exponent. For example, the randomized exponentiation component 104 can perform a left-to-right exponentiation (e.g., square-and-multiply exponentiation) with the first vector of the exponent. The results of this exponentiation can be stored as partial results.

The randomized exponentiation component 104 can also perform a disparate type of exponentiation with the second vector (e.g., d2) by scanning it from $bit_k$ to $bit_{m-1}$, that is, scanning from the bit corresponding to random number k outward to the most significant bit (MSB) (e.g. $bit_{m-1}$) in the exponent. The disparate type of exponentiation can be a Russian Peasant exponentiation (e.g., right-to-left exponentiation), for example. The partial results of the first type of exponentiation (e.g., left-to-right exponentiation) can be utilized as part of initial values for the disparate type of exponentiation. The value returned by the disparate type of exponentiation can be a final result, which the cryptographic component 102 can provide as an output, which can be decrypted data, a digital signature associated with a user, and/or other output associated with a cryptographic protocol, for example.

For example, the randomized exponentiation component 104 can process an exponent in accordance with a binary random exponent splitting combinational algorithm. The randomized exponentiation component 104 can receive a message g, an m-bit exponent d associated therewith and a random number k, and can determined an output y, as more fully described in the example code below.

```
Binary Random Exponent Splitting Combinational Algorithm
Input: message g, m-bit exponent d represented in a binary form, i.e.,
d = [d_{m-1},
..., d_{0}]_{2}, random value k, m-1=>k>0
Output: y=g^d
    /* Part 1 - exponentiation from bit k-1 to LSB*/
    /* Initialization*/
    R0:=1; R1:=g; R2:=g
    /* Computations of R0 and R1 can be done in any order or in
    parallel */
    for (i=k-1 down to 0) do
    {
        R1: = R1*R1
        R0: = R0*R0
        if (d_i=1) then
            R0:=R0*R2
        end if
    }
    /* R0 can keep current result of exponentiation, R1 stores auxiliary
    value */
    /* Part 2 - exponentiation from bit k to MSB: Russian Peasant
    algorithm */
    /* Part 2 can be executed after Part 1 using the results of Part 1*/
    /* Initialization for Russian Peasant can take values R0 and R1
    from Part 1*/
    for (i=k to m-1) do
    {
        if (d_i=1) then
            R0:=R0*R1
        end if
        R1:=R1*R1
    }
/* Return result of computations R0 */
return R0
```

The returned value, R0, can be the output value $y=g^d$, which can be the decrypted data, a digital signature of a user, and/or other output associated with a cryptographic protocol, for example. By starting the computations "in the middle" of the exponent (e.g. at $bit_k$ of the exponent), the randomized exponentiation component 104 can add de-synchronization of power curves from the bits of the exponent being processed. Thus, since an attacker will not know from which bit of the exponent execution is started, the attacker cannot successfully accomplish a "chosen message attack." As a result, base randomization can be avoided.

As another example in accordance with the disclosed subject matter, the randomized exponentiation component 104 can process an exponent utilizing the binary random exponent splitting combinational algorithm, which can be implemented in a manner such that the risk of side-channel attacks can be reduced by eliminating difference in computations regardless of the values (e.g., zero or one) of the bits d(i) of the exponent, for example, using a Montgomery Powering Ladder or atomic computations, as shown in the example code below. In the example code below, the randomized exponentiation component 104 can receive a message g, an m-bit exponent d associated therewith and a random number k, and can determined an output y.

```
Binary Random Exponent Splitting Combinational Algorithm without
conditional branches
Input: message g, m-bit exponent d represented in a binary form, i.e.,
d=(d_{m-1},
..., d_{0})_{2}, random value k, m-1>k>0
Output: y=g^d
    /* Part 1: Atomic computations for Left-to-Right binary method */
    /* Initialization*/
    R_0=1; R_1=g; R_2=g;
    /* Computations of R_0 and R_1 can be done in any order and/or in
    parallel */
    /* Variable R_2 can keep the input value g */
    /* Variable R_1 can accumulate the square powers of g required for
    Part 2 */
    /* Variable R_0 can accumulate partial result of exponentiation */
    for (i = k-1 down to 1) do
    {
        b := 1 - d_i
        R_0 := R_0*R_{2*d_i}
        d_i := 0; i := i-b
    }
    if (d_0=1) then
        R_0 := R_0*R_2
    end if
    for (i = k-1 down to 0) do
    {
        R_1 := R_1* R_1
    }
    /* Part 2 */
    /* Initialization for Russian Peasant - continue with values R_0 and
    R_1*/
    b:=1
    /* Atomic computations for Russian Peasant */
    for (i=k to m-1) do
    {
        b:=b⊕d_i
        R_b:=R_b*R_1; i=i+b
    }
    /* Return result of computations R_0 */
return R_0
```

With regard to the above example code, the returned value, R0, can be the output value $y=g^d$, which can be the decrypted data, a digital signature of a user, and/or other output associated with a cryptographic protocol, for example.

In accordance with another embodiment of the disclosed subject matter, the cryptographic component 102 can receive a message g and an exponent d associated therewith that can be comprised of m bits. The randomized exponentiation component 104 can generate and/or receive a random number k that can have a value between 0 and m-1. The randomized exponentiation component 104 can select the position of the bit in the exponent that corresponds to the random number k, and can split the exponent into two vectors at the exponent bit corresponding with the random number. The randomized exponentiation component 104 can perform a first type of exponentiation (e.g., left-to-right exponentiation) with the first vector scanning from $bit_{m-1}$ to $bit_k$, that is, scanning inward from the MSB to $bit_k$ of the exponent that corresponds to the random bit k. The results of this first type of exponentiation can be stored as partial results. The randomized exponentiation component 104 can also perform a disparate type of exponentiation (e.g. Russian Peasant exponentiation) with a second vector scanning from $bit_0$ to $bit_{k-1}$, that is, scanning inward from the LSB to the bit that precedes $bit_k$ in the exponent. The results of the disparate type of exponentiation can be stored. The randomized exponentiation component 104 can combine the results of the first type of exponentiation and the results of the disparate type of exponentiation to yield a final value. The cryptography component 102 can provide the final value, which can be a decrypted message or digital signature, for example, as an output.

For instance, the randomized exponentiation component 104 can exponentiate in accordance with a binary random exponent splitting interleaved algorithm. The randomized exponentiation component 104 can receive a message g, an m-bit exponent d associated therewith, which can be represented in binary form, a random number k, and can determine an output y, which can be decrypted data or a digital signature, for example, as more fully described in the example code below:

```
Binary Random Exponent Splitting Interleaved Algorithm
Input: message g, m-bit exponent d represented in binary form,
d=[d_{m-1}, ...,
d_0]_2, random k, m-1>k>0;
/* Exponent d is split into vectors d1=[d_{m-1} .. d_k]_2,
d2=[d_{k-1} .. d_0]_2 */
Output: y=g^d
    /* Part 1 and Part 2 can be executed in any order or in parallel */
    /* Part 1: Left-to-Right */
    /* Initialization for Left-to-Right */
    R_2:=1; R_3:= g
    /* Store partial result for Part 1 in temporary variable R_2 */
    /* Store input value g in temporary variable R_3 */
    /* Computations can optionally be atomic or Montgomery Power
    Ladder */
    for (i=m-1 down to k) do
    {
        R_2:=R_2 * R_2
        if (d_i=1) then
            R_2:=R_2*R_3
        end if
    }
    /* Part 2 */
    /* Initialization for Russian Peasant */
    /* R_0 stores partial results of exponentiation */
    /* R_1 can keep the square powers of g, i.e., after iteration j, R_1=g^{2^j},
    0<=j<k */
    R_0:=1; R_1:=g
    /* Computations can optionally be atomic or Montgomery Power
    Ladder */
    for (j=0 to k-1) do
    {
        if (d_j =1) then
            R_0:=R_0*R_1
        end if
        R_1:=R_1* R_1
        R_2 :=R_2* R_2
    }
    /* Combine results of left-to-right and Russian Peasant */
    {
    R_0 :=R_2*R_0
    }
Return R0
```

In the above example, the returned value, R0, can be the output value $y=g^d$, which can be the decrypted data, a digital signature of a user, and/or other output associated with a cryptographic protocol, for example.

In accordance with another aspect of the disclosed subject matter, the randomized exponentiation component 104 can employ ECC-based algorithms to facilitate encryption/decryption of data and/or generation of digital signatures to facilitate securing data. When employing ECC, the exponentiation algorithms can be effectively and equivalently replaced with point multiplications. In other words, instead of raising an integer g to the power d in order to obtain the result $y=g^d$, a point P on an elliptic curve over a finite field can be multiplied by an integer d in order to obtain a point Q=d·P. Thus, traditional right-to-left and left-to-right exponentiation algorithms can be transposed into right-to-left and left-to-right point multiplication algorithms in which the bits of the integer d can be scanned from right to left or from left to right, in accord with the particular ECC algorithm, and a double and add multiplication approach can be used instead of the square and multiply approach employed for exponentiation. In accordance with the disclosed subject matter, the randomized exponentiation system(s) and/or method(s) can be regular and/or modular exponentiation algorithms and/or point multiplication algorithms on an Elliptic Curve.

In accordance with another aspect of the disclosed subject matter, the randomized exponentiation component 104 can employ interleaving as another countermeasure against side channel and other attacks, in addition to random exponent splitting and performing disparate types of exponentiation on data utilizing split vectors associated with an exponent. For example, in accordance with the binary random exponent splitting interleaved algorithm, the first type of exponentiation and the disparate type of exponentiation can be performed independent of each other. As a result, the respective exponentiations can be performed in parallel (as discussed infra) and/or in an interleaved manner, such as by performing a predetermined number of iterations related to first type of exponentiation, storing the partial results related thereto, then alternating to perform a predetermined number of iterations related to the disparate type of exponentiation and storing the partial results related thereto, and continuing to rotate between the respective exponentiations until the final result is reached.

For example, with regard to the above example code, four intermediary variables (e.g., R0, R1, R2, and R3) can be employed with two of the variables being utilized to indicate temporary values associated with the exponentiation performed during the current iteration, where such temporary values can be stored. Another variable can be utilized to facilitate switching between the disparate types of exponentiation, and the fourth variable can be utilized to facilitate indicating the number of iterations to be performed for each respective type of exponentiation. By employing such an interleaving extension, the risk of an attack can be reduced or minimized, as obtaining side channel information related to power analysis or other analysis (e.g. electromagnetic analysis) can be impeded. Other interleaving techniques are discussed infra, for example, with regard to FIG. 4.

In accordance with still another aspect of the disclosed subject matter, the randomized exponentiation component 104 can include a computation component (e.g., modular multiplication accelerator) (not shown) that can be comprised of one or more computation subcomponents (e.g., multiply-accumulate units) (not shown) that can each perform the respective computations associated with the first type of exponentiation (e.g., left-to-right exponentiation) and the disparate type of exponentiation (e.g., Russian Peasant exponentiation). In one aspect, the first type of exponentiation and the disparate type of exponentiation can be performed independent of each other. As such, by utilizing more than one computation subcomponent, the randomized exponentiation component 104 can perform the first type of exponentiation in parallel with the disparate type of exponentiation, which can yield results in a more time-efficient manner and can provide additional data security, as parallel operations can confuse an attacker attempting a side-channel attack or other type of attack to discover the exponent. The randomized exponentiation component 104 can facilitate controlling the computation subcomponents and other components (e.g., memory (not shown), and/or random number generator (not shown)) to control the exponentiation process.

In accordance with yet another aspect of the disclosed subject matter, when performing the exponentiation, the randomized exponentiation component 104 can employ other attack countermeasures and/or measures that can facilitate increasing computational speeds, such as utilizing an atomic version of computation algorithms (e.g., atomic version of Russian Peasant exponentiation, atomic version of left-to-right exponentiation, high radix (e.g., radix 4) left-to-right sliding windows and/or odd powers only algorithm, and/or high radix (e.g. radix 4) Russian Peasant algorithm), and/or the Montgomery Power Ladder method, for example.

It is to be appreciated that, while the disclosed subject matter can be described with regard to splitting an exponent into two vectors and exponentiating with such vectors, the subject innovation is not so limited. The subject innovation contemplates that the exponent can be split or divided into any desirable number of vectors with which respective types of exponentiation can be performed. In addition, the subject innovation contemplates that an exponent can be split recursively such that an exponent split into vectors, and one or both vectors can then be split into subvectors, and so forth, as desired, in accordance with the disclosed subject matter.

Figure 2:
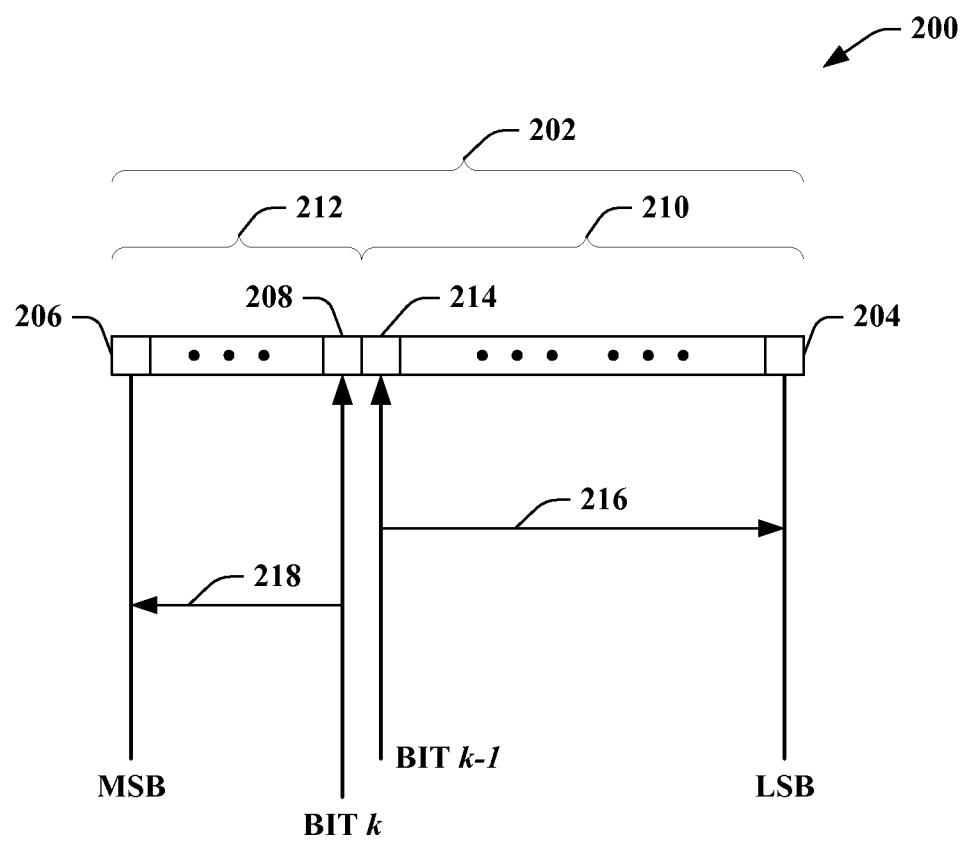
FIG. 2 illustrates a diagram of an example of exponent scanning of a split exponent that facilitates data security in accordance with an aspect of the disclosed subject matter.

Referring to FIG. 2, depicted is a diagram 200 of an example of exponent scanning of a split exponent that facilitates data security in accordance with an aspect of the disclosed subject matter. Diagram 200 includes an exponent 202, which can be a private key or piece of data, that can be utilized to facilitate securing data in accordance with a cryptographic protocol. The exponent 202 can be comprised of m bits ranging from the least significant bit (LSB) 204 (e.g., $bit_0$) to the most significant bit (MSB) 206 (e.g., $bit_{m-1}$). In accordance with an aspect of the disclosed subject matter, the randomized exponentiation component (e.g., 104) (not shown) can facilitate splitting the exponent 202 into more than one vector based on a randomly generated number k. For example, the exponent 202 can be split at $bit_k$ 208 into a first vector 210 and a second vector 212, where the first vector 210 can include the exponent bits from the LSB 204 to $bit_{k-1}$ 214, and the second vector 212 can include the exponent bits from $bit_k$ 208 to the MSB 206.

In accordance with one aspect of the disclosed subject matter, a first type of exponentiation can be performed on data utilizing the first vector 210 by scanning the exponent bits from $bit_{k-1}$ 214 to the LSB 204, as depicted at 216 of diagram 200. A second type of exponentiation can be performed on data with the second vector 212 by scanning the exponent bits from $bit_k$ 208 to the MSB 206, as depicted at 218 of diagram 200. For example, a left-to-right exponentiation can be performed with the first vector 210 by scanning the exponent bits from $bit_{k-1}$ 214 to the LSB 204, and a right-to-left exponentiation can be performed with the second vector 212 by scanning the exponent bits from $bit_k$ 208 to the MSB 206.

Figure 3:
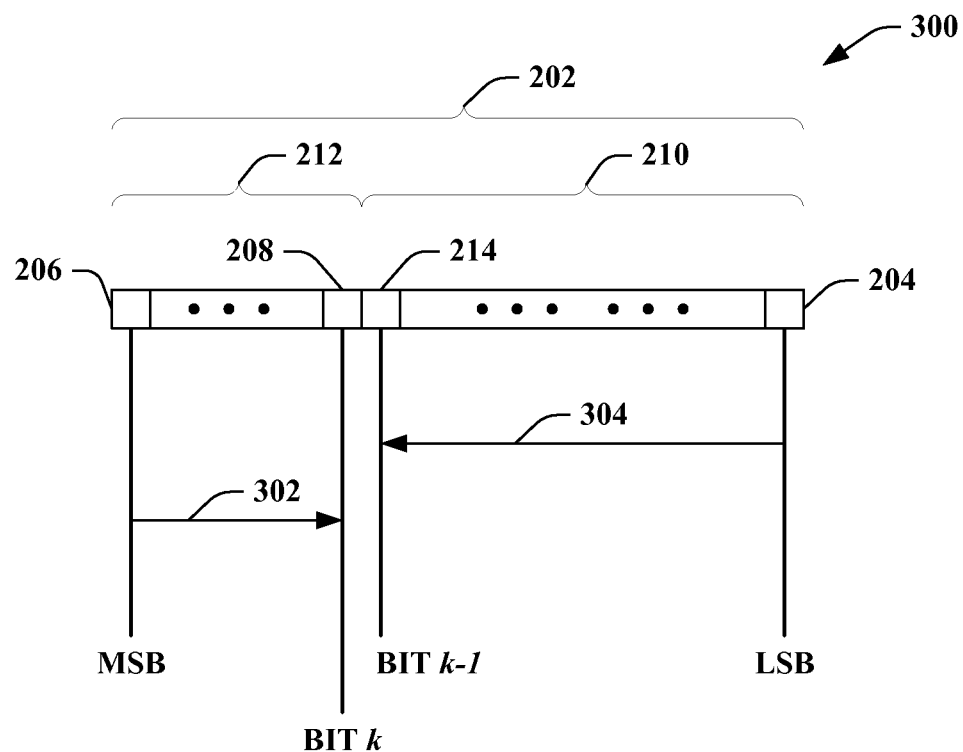
FIG. 3 depicts a diagram of another example of exponent scanning of a split exponent that facilitates data security in accordance with an aspect of the disclosed subject matter.

Turning to FIG. 3, illustrated is a diagram 300 of another example of exponent scanning of a split exponent that facilitates data security in accordance with an aspect of the disclosed subject matter. Diagram 300 includes an exponent 202, which can be, for example, a private key or piece of data, that can be utilized to facilitate securing data. The exponent 202 can be comprised of m bits ranging from the LSB 204 (e.g., $bit_0$) to the MSB 206 (e.g., $bit_{m-1}$).

In accordance with an aspect of the disclosed subject matter, the randomized exponentiation component (e.g., 104) (not shown) can facilitate splitting the exponent 202 into more than one vector based on a randomly generated number k, where, for example, the exponent 202 can be split at $bit_k$ 208 into a first vector 210 and a second vector 212. The first vector 210 can include the exponent bits from the LSB 204 to $bit_{k-1}$ 214, and the second vector 212 can include the exponent bits from $bit_k$ 208 to the MSB 206.

A first type of exponentiation can be performed on data with the second vector 212 by scanning each of the exponent bits proceeding from the MSB 206 to $bit_k$ 208, as depicted at 302 of diagram 300. A second type of exponentiation can be performed on data with the first vector 210 by scanning each of the exponent bits proceeding from the LSB 204 to the $bit_{k-1}$ 214, as depicted at 304 of diagram 300. For example, a left-to-right exponentiation can be performed on the data with the second vector 212 by scanning the exponent bits from the MSB 206 to $bit_k$ 208, and a right-to-left exponentiation can be performed on the data with the first vector 210 by scanning the exponent bits from the LSB 204 to the $bit_{k-1}$ 214.

Figure 4:
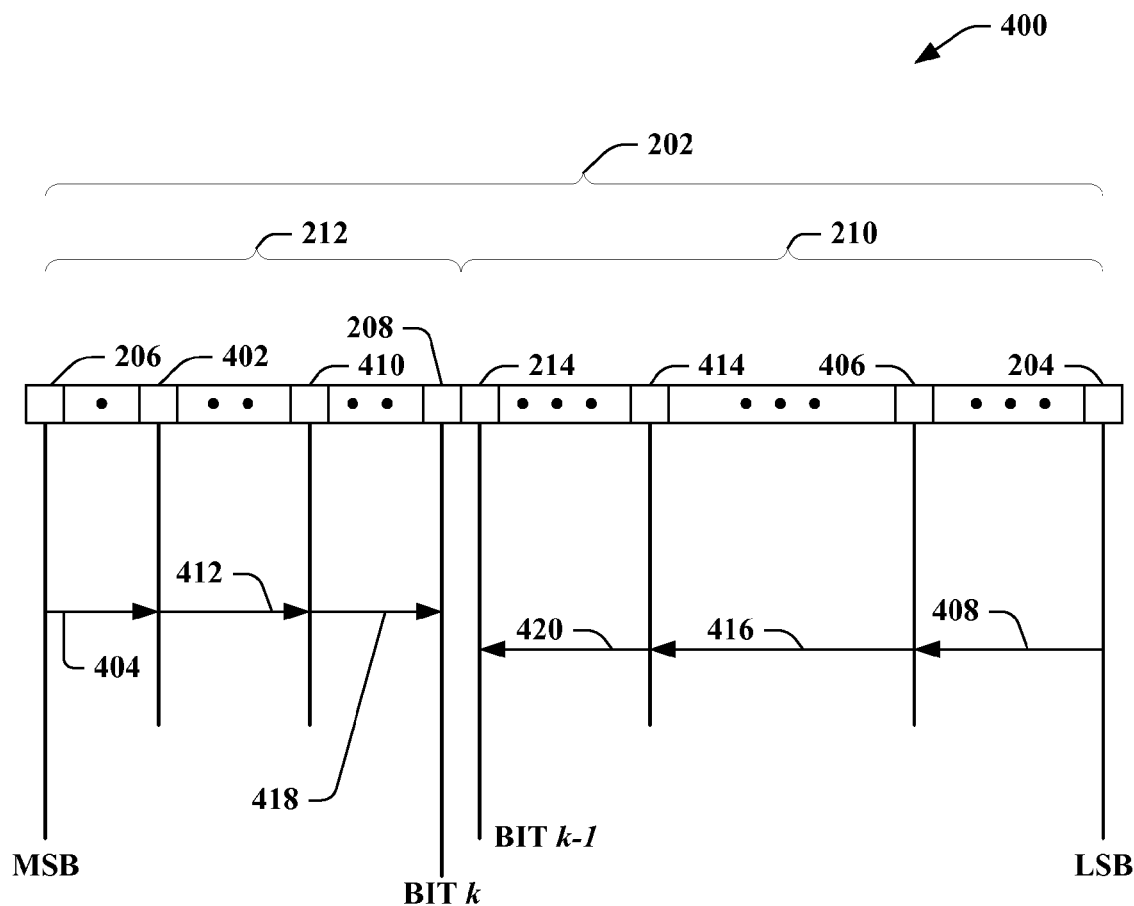
FIG. 4 illustrates a diagram of an example of interleaved exponent scanning of a split exponent that facilitates data security in accordance with an aspect of the disclosed subject matter.

FIG. 4 depicts a diagram 400 of an example of interleaved exponent scanning of a split exponent that facilitates data security in accordance with an aspect of the disclosed subject matter. Diagram 400 includes an exponent 202, which can be, for example, a private key or piece of data, that can be utilized to facilitate securing data. The exponent 202 can be comprised of m bits ranging from the LSB 204 (e.g. $bit_0$) to the MSB 206 (e.g., $bit_{m-1}$). In accordance with an aspect of the disclosed subject matter, the randomized exponentiation component (e.g., 104) (not shown) can facilitate splitting the exponent 202 into more than one vector based on a randomly generated number k, where, for example, the exponent 202 can be split at $bit_k$ 208 into a first vector 210 and a second vector 212. The first vector 210 can include the exponent bits from the LSB 204 to $bit_{k-1}$ 214, and the second vector 212 can include the exponent bits from $bit_k$ 208 to the MSB 206, for example.

In accordance with one aspect of the disclosed subject matter, the exponentiations with the respective vectors 210, 212 can be performed in an interleaved manner. A first type of exponentiation (e.g. left-to-right exponentiation) can be performed on the data with the second vector 212 by scanning each of the exponent bits proceeding from the MSB 206 to $bit_k$ 208, and a second type of exponentiation (e.g., right-to-left exponentiation) can be performed on the data with the first vector 210 by scanning each of the exponent bits proceeding from the LSB 204 to the $bit_{k-1}$ 214.

Employing an interleaving technique, the randomized exponentiation component 104 can perform a dynamically determined number(s) and/or predetermined number(s) of iterations with regard to each type of exponentiation utilizing each respective vector, or portion thereof, and alternating between the exponentiation types and respective vectors until the exponentiation is complete, where the number of iterations can be a number that is smaller than the number of bits of a particular vector, for example. Temporary results associated with each portion of such exponentiations can be stored and/or utilized to provide initial values for the next set of iterations related to the other vector and/or to provide intermediary values for the next set of iterations related to the same vector, as desired in accordance with the particular algorithm being employed for the particular set of iterations.

For example, based on a dynamically determined number(s) and/or predetermined number(s) of iterations, a first set of iterations can be performed to exponentiate data with the second vector 212 by scanning the second vector 212 from the MSB 206 to the bit 402, which can have a position corresponding to an iteration number s such that the bit 402 can be positioned s bits away from the MSB 206, as indicated at 404. Temporary values from such exponentiation can be stored. A new iteration number s can be generated or determined, and a set of iterations can be performed to exponentiate the data with the first vector 210 by scanning from the LSB 204 to the bit 406, which can have a position corresponding to the current iteration number s such that the bit 406 can be positioned s bits away from the LSB 204, as indicated at 408. Temporary values from this exponentiation can be stored.

The interleaving can continue by alternating between the two vectors 210, 212 and the corresponding two types of exponentiation algorithms. Based on a new iteration number s, exponentiation of the data with the second vector 212 can continue from bit 402 by scanning s bits to bit 410, as indicated at 412. With new iteration number s, exponentiation of the data with the first vector 210 can continue from bit 406 by scanning s bits to bit 414, as indicated at 416. Further, given a new s, exponentiation of the data with the second vector 212 can continue from bit 410 by scanning s bits to $bit_k$ 208, as indicated at 418. With new iteration number s, exponentiation of the data with the first vector 210 can continue from bit 414 by scanning s bits to bit 214, as indicated at 420. The final value resulting from the exponentiation of the data with the exponent can be based on a combination of the exponentiations of the respective vectors. The final value (e.g., decrypted data, digital signature) can be provided as an output.

It is to be appreciated that the number of iterations that are to be performed with regard to a particular vector can be determined in various ways. For example, the randomized exponentiation component can facilitate generating a random value t, where $0 \le t \le (\min(m-1-k, k))$, which can be generated before an execution of each exponentiation type. The random value t can be generated anew for each execution of an exponentiation type, which can thereby facilitate reducing the risk of a statistical attack on the data or exponent. An alternative interleaving technique can be employed whereby, prior to the execution of the particular exponentiation and/or at each iteration, a random bit r can be generated. If the value of r is 1, then one iteration of exponentiation with the first vector is performed; if the value of r is 0, then one iteration of the second vector is performed. The iterations can be performed based on the random bit r until the exponentiation is complete. Where exponentiation with one vector is completed prior to exponentiation with the other vector, the exponentiation with the other vector can continue without further interleaving until the exponentiation is complete.

Yet another interleaving technique that can be employed in accordance with the disclosed subject matter, whereby the randomized exponentiation component can generate a priori a set of small random values $0<t1<t2< \ldots <tn<m-1$ for $n \ge 3$. If t1 is odd, exponentiation with the first vector can be performed utilizing the corresponding algorithm, otherwise exponentiation with the second vector can be performed utilizing the algorithm corresponding therewith. The randomized exponentiation component can perform t2 iterations of the corresponding vector, and can store intermediate results in respective temporary variables, and can then continue in a similar manner starting with the value t3. When all generated random values t1 through tn have been utilized, if the computations have not yet been completed, the randomized exponentiation component can continue by generating a new set of random values t1 through tn and can use such values to determine the number of iterations to perform during that exponentiation cycle, as described above, until the exponentiations of the vectors are complete. The results of the respective subexponentiations can be combined to yield a final result (e.g., decrypted data, digital signature) that can be provided as an output.

It is to be appreciated that the above interleaving techniques are given for purposes of example, and not by way of limitation, and the subject innovation contemplates that a variety of interleaving techniques can be utilized to facilitate exponentiation of data utilizing an exponent in accordance with the disclosed subject matter.

Figure 5:
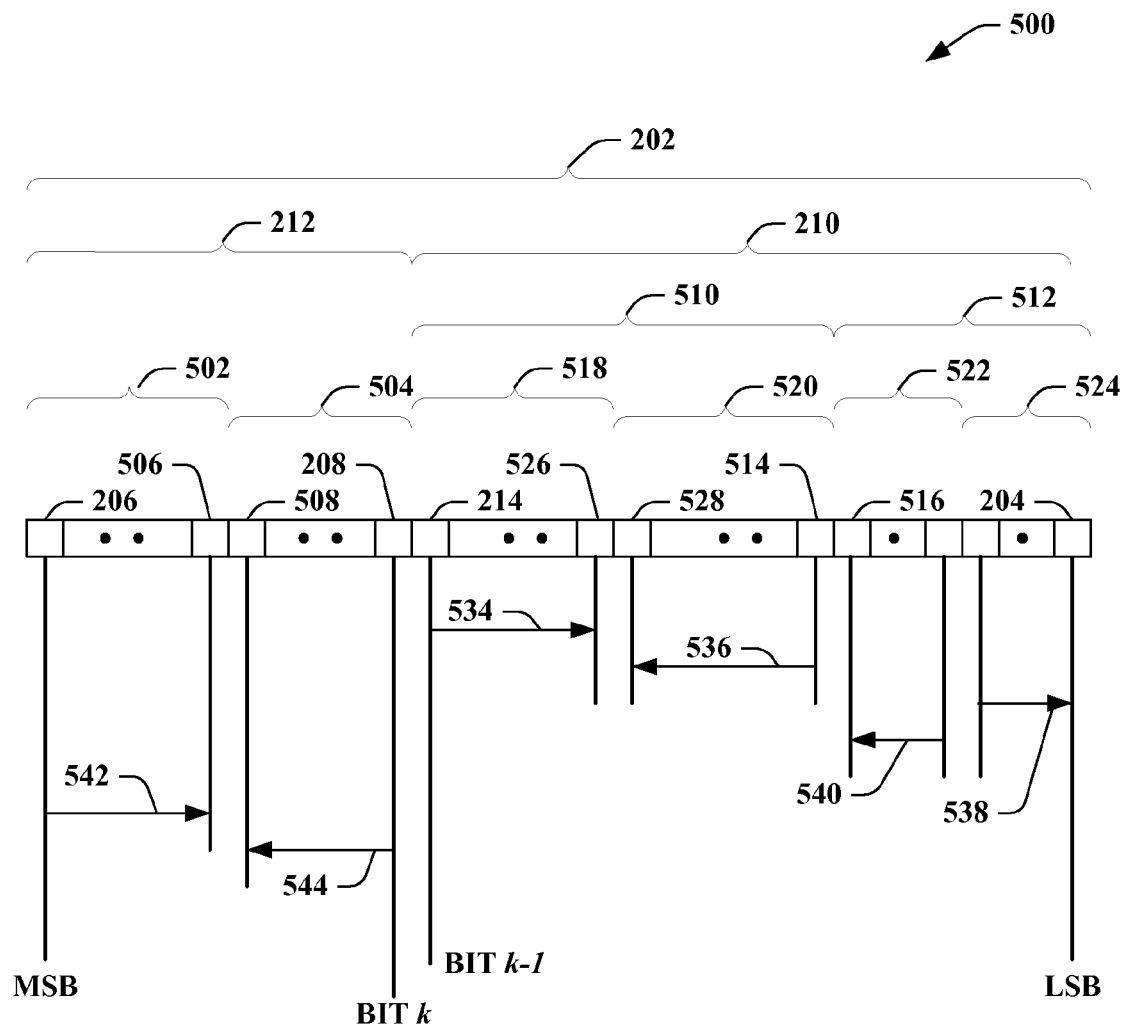
FIG. 5 depicts a diagram of an example of exponent scanning of a multi-split exponent that facilitates data security in accordance with an aspect of the disclosed subject matter.

FIG. 5 illustrates a diagram 500 of an example of multi-splitting and/or recursive splitting of an exponent to facilitate data security in accordance with an aspect of the disclosed subject matter. Diagram 500 includes an exponent 202, which can be, for example, a private key or other piece of secret data, that can be utilized to facilitate securing associated data. The exponent 202 can be comprised of m bits ranging from the LSB 204 (e.g., $bit_0$) to the MSB 206 (e.g. $bit_{m-1}$).

In accordance with an aspect of the disclosed subject matter, the randomized exponentiation component (e.g., 104) (not shown) can facilitate splitting the exponent 202 into more than one vector based on a randomly generated number k, where, for example, the exponent 202 can be split at $bit_k$ 208 into a first vector 210 and a second vector 212. The first vector 210 can include the exponent bits from the LSB 204 to $bit_{k-1}$ 214, and the second vector 212 can include the exponent bits from $bit_k$ 208 to the MSB 206, for example.

The second vector 212 can also be split into subvectors 502 and 504 based on a randomly generated number that can correspond to a bit that can be positioned from $bit_k$ 208 to the MSB 206 (e.g., $bit_{m-1}$), where subvector 502 can span from the MSB 206 to bit 506, and subvector 504 can span from $bit_k$ 208 to bit 508, which can have a position that corresponds to the randomly generated number. The first vector 210 can be split into two subvectors 510 and 512 based on another randomly generated number u that can be between 0 and k-1, where subvector 510 can span from $bit_{k-1}$ 214 to bit 514 (e.g., $bit_u$), and subvector 512 can span from bit 516 to the LSB 204. Further, as desired, the subvectors 510 and 512 can each be split recursively, where subvector 510 can be split into subvectors 518 and 520, and subvector 512 can be split into subvectors 522 and 524. Subvector 518 can span from $bit_{k-1}$ 214 to bit 526, and subvector 520 can span from bit 528 to bit 514, based on yet another randomly generated number. Also, subvector 522 can span from bit 530 to bit 516, and subvector 524 can span from bit 532 to the LSB 204, based on still another randomly generated number.

Exponentiating a message (e.g., data) with the exponent 202 comprised of its subvectors (e.g., 502, 504, 518, 520, 522, and 524) involves exponentiating a message with each set of corresponding subvectors (e.g. 518, 520) utilizing appropriate algorithms and initialization values. For example, if a left-to-right type of exponentiation algorithm (e.g., utilizing the Binary Random Exponent Splitting Interleaved Algorithm) is selected for subvector 518 to scan from left to right each of the bits (e.g., $bit_{k-1}$ 214 to bit 526) in the subvector 518, such as is depicted at 534, then it is desirable to select a right-to-left type of exponentiation algorithm (e.g., in accordance with the Binary Random Exponent Splitting Interleaved Algorithm) to exponentiate data with subvector 520 so that the bits (e.g., bit 514 to bit 528) of subvector 520 can be scanned from right to left, as is depicted at 536, in order for the results of the exponentiations with these two subvectors 518, 520 to be useful. Further, it is desirable to begin exponentiation of the message from the middle of the exponent (e.g., at $bit_{k-1}$ 214 when exponentiating with a subvector of vector 210).

To continue with the example illustrated in diagram 500, after exponentiation of the message with subvectors 518 and 520, exponentiation of the message with subvectors 522 and 524 can be performed, where, for example, upon initializing with suitable initial values, a left-to-right exponentiation (e.g., utilizing the Binary Random Exponent Splitting Combinational Algorithm) can be performed with subvector 524 to scan the exponent from the bit 532 to the LSB 204, as depicted at 538, and a right-to-left exponentiation (e.g., in accordance with the Binary Random Exponent Splitting Combinational Algorithm) can be performed with subvector 522 to scan each bit from bit 530 to bit 516, as illustrated at 540.

After exponentiation of the message with subvectors 522 and 524, exponentiation of the message with subvectors 502 and 504 can be performed, where, for example, upon initializing with suitable initial values, a left-to-right exponentiation (e.g., utilizing the Binary Random Exponent Splitting Interleaved Algorithm) can be performed with subvector 502 by scanning each bit of subvector 502 from the MSB 206 to bit 506, as depicted at 542, and a right-to-left exponentiation (e.g., in accordance with the Binary Random Exponent Interleaved Algorithm) can be performed with subvector 504 by scanning each bit of subvector 504 from $bit_k$ 208 to bit 508, as illustrated at 544. The results of the respective subexponentiations can be combined to yield a final result that can be provided as an output (e.g., decrypted data, digital signature).

It is to be appreciated that any appropriate types of exponentiation algorithms (e.g., Binary Random Exponent Splitting Combinational Algorithm, Binary Random Exponent Splitting Interleaved Algorithm, etc.) can be employed, as desired, so long as proper initialization of sub-exponentiations is performed.

It also is to be appreciated that, to facilitate exponentiating data with an exponent that has been split multiple times and/or recursively, it is desirable to modify the algorithms (e.g., left-to-right algorithm, right-to-left algorithm, etc.) such that appropriate initial values and intermediary values can be determined accordingly.

It is to be further appreciated that the multi-splitting and/or recursive splitting of an exponent described in diagram 500 is for purposes of example only, and not limitation, and the subject innovation contemplates that an exponent can be split into more (or less) vectors or subvectors than that described in diagram 500, in accordance with the disclosed subject matter. Further, the exponent 202 can be split into a number of vectors in a non-recursive manner, such as where multiple random numbers are initially generated that each correspond to a respective bit in the exponent 202, and the exponent 202 is split into multiple vectors based on the number of random numbers generated. Alternatively, for example, the exponent 202 can be split recursively, such as where an exponent 202 is split into two vectors based on a random number, and one or both of the vectors is then subdivided into a desired number of subvectors based on other random numbers that can be generated.

Figure 6:
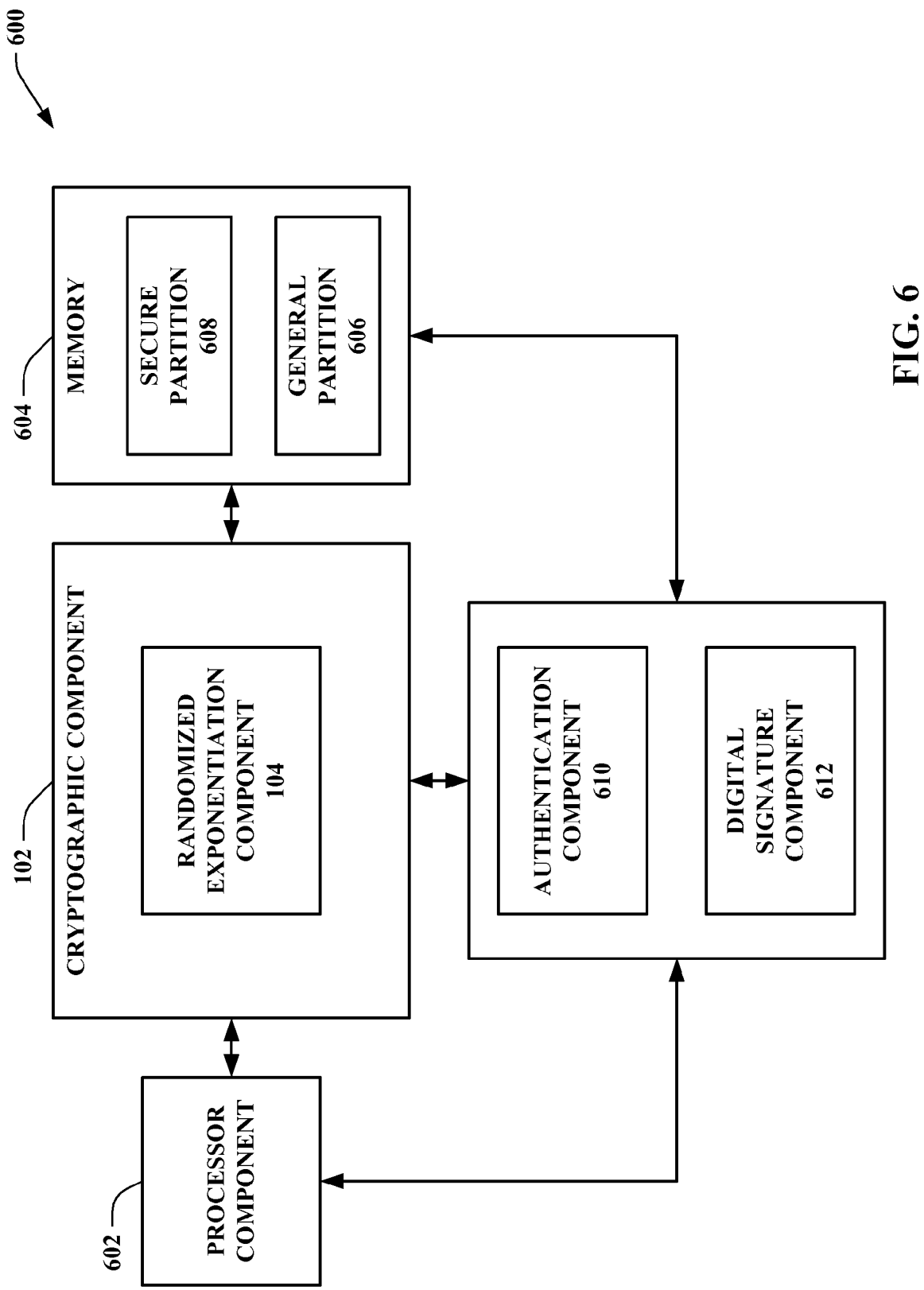
FIG. 6 illustrates a block diagram of a system that facilitates secure electronic communication of data in accordance with an aspect of the subject matter disclosed herein.

Referring to FIG. 6, a block diagram of a system 600 that facilitates securing the electronic communication of data in accordance with the disclosed subject matter is illustrated. For example, system 600 can be associated with the electronic communication of information associated with RSA cryptography, ECC, Diffie-Hellman cryptography, Digital Signature Algorithm (DSA) cryptography, and/or Elliptic Curve DSA cryptography, for example. System 600 can include a host processor 602 that can be associated with a cryptography component 102. In accordance with one embodiment of the disclosed subject matter, the host processor 602 can be a typical applications processor that can manage communications and run applications. For example, the host processor 602 can be a processor that can be utilized by a computer, a mobile handset, PDA, or other electronic device. In accordance with another embodiment of the disclosed subject matter, the host processor 602 can be a microprocessor (e.g. 16-bit microprocessor) that is of a size such that the host processor 602 can be utilized in a smart card or other small electronic device and can manage electronic communication of information, run applications, and/or process data associated with the smart card or other small electronic device. The host processor 602 can generate commands, including read, write, and/or erase commands, in order to facilitate reading data from, writing data to, and/or erasing data from memory 604.

The cryptographic component 102 can facilitate encrypting data being written to memory 204 and/or decrypting data being read from memory 604, and/or can facilitate generating a digital signature associated with a user(s) and/or data. The cryptographic component 102 can include a randomized exponentiation component 104 that can employ randomization in the exponentiation of encrypted data to facilitate decrypting the data being read from memory 604 and/or generating a digital signature in a secure manner such that the risk of side-channel attacks or other types of attacks in an attempt to discover the exponent associated with the data can be reduced or minimized. The cryptographic component 102 and randomized exponentiation component 104 can each include such functionality as described herein with respect to such components, for example, with regard to system 100.

The memory 604 can facilitate storing data being written to memory 604 and accessing data being read from memory 604. The memory 604 can be partitioned into a desired number of partitions, and, for example, can include a general partition 606 and a secure partition 608. The general partition 606 can store and/or provide data, including data for which general access is desired. The secure partition 608 can store data for which a heightened level of security is desired. For example, the secure partition 608 can store information such as information associated with a private key(s) (e.g., secret key or data) of an entity (e.g., user) utilizing the electronic device.

It is to be appreciated that the memory 604 can be, for example, either volatile memory or nonvolatile memory, or can include both volatile and non-volatile memory. By way of illustration, and not limitation, non-volatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The memory 604 of the subject systems and methods is intended to comprise, without being limited to, these and any other suitable types of memory. In addition, it is to be appreciated that the memory 604 can be a server, a database, a hard drive, and the like.

Cryptographic component 102 can also provide asymmetric cryptographic accelerators and tools (e.g., RSA, Digital Signature Standard (DSS), and the like) to ensure that a specified partition in memory 604, or portions thereof, are only accessed by those entities that are authorized and certified to do so. Additionally, cryptographic component 102 can provide accelerators and tools (e.g., Secure Hash Algorithm (SHA) and its variants such as, for example, SHA-0, SHA-1, SHA-224, SHA-256, SHA-384, and SHA-512) to ensure that access to the specified partition in memory 204 is confined to those entities authorized to gain access.

System 600 can further include an authentication component 610 that can solicit authentication data from an entity, and, upon the authentication data so solicited, can be employed, individually and/or in conjunction with information acquired and ascertained as a result of biometric modalities employed, to facilitate control access to the memory 604. The authentication data can be in the form of a password (e.g., a sequence of humanly cognizable characters), a pass phrase (e.g., a sequence of alphanumeric characters that can be similar to a typical password but is conventionally of greater length and contains non-humanly cognizable characters in addition to humanly cognizable characters), a pass code (e.g., Personal Identification Number (PIN)), and the like, for example. Additionally and/or alternatively, public key infrastructure (PKI) data can also be employed by authentication component 610. PKI arrangements can provide for trusted third parties to vet, and affirm, entity identity through the use of public keys that typically can be certificates issued by the trusted third parties. Such arrangements can enable entities to be authenticated to each other, and to use information in certificates (e.g., public keys) and private keys, session keys, Traffic Encryption Keys (TEKs), cryptographic-system-specific keys, and/or other keys, to encrypt and decrypt messages communicated between entities.

The authentication component 610 can implement one or more machine-implemented techniques to identify an entity by its unique physical and behavioral characteristics and attributes. Biometric modalities that can be employed can include, for example, face recognition wherein measurements of key points on an entity's face can provide a unique pattern that can be associated with the entity, iris recognition that measures from the outer edge towards the pupil the patterns associated with the colored part of the eye—the iris—to detect unique features associated with an entity's iris, and finger print identification that scans the corrugated ridges of skin that are non-continuous and form a pattern that can provide distinguishing features to identify an entity.

System 600 can further include a digital signature component 612 that can facilitate generation of a digital signature associated with an entity, where the digital signature can be associated with an electronic document, for example. A private key(s) (e.g., signature key) can be associated with an associated digital signature(s) and can be stored in the secure partition 608 in memory 604. The private key(s) associated with the digital signature can be accessed from the secure partition 608 in memory 604 upon the presentation of authentication information that can identify the entity seeking to access such private key and demonstrates that the entity is authorized to access such private key.

Figure 7:
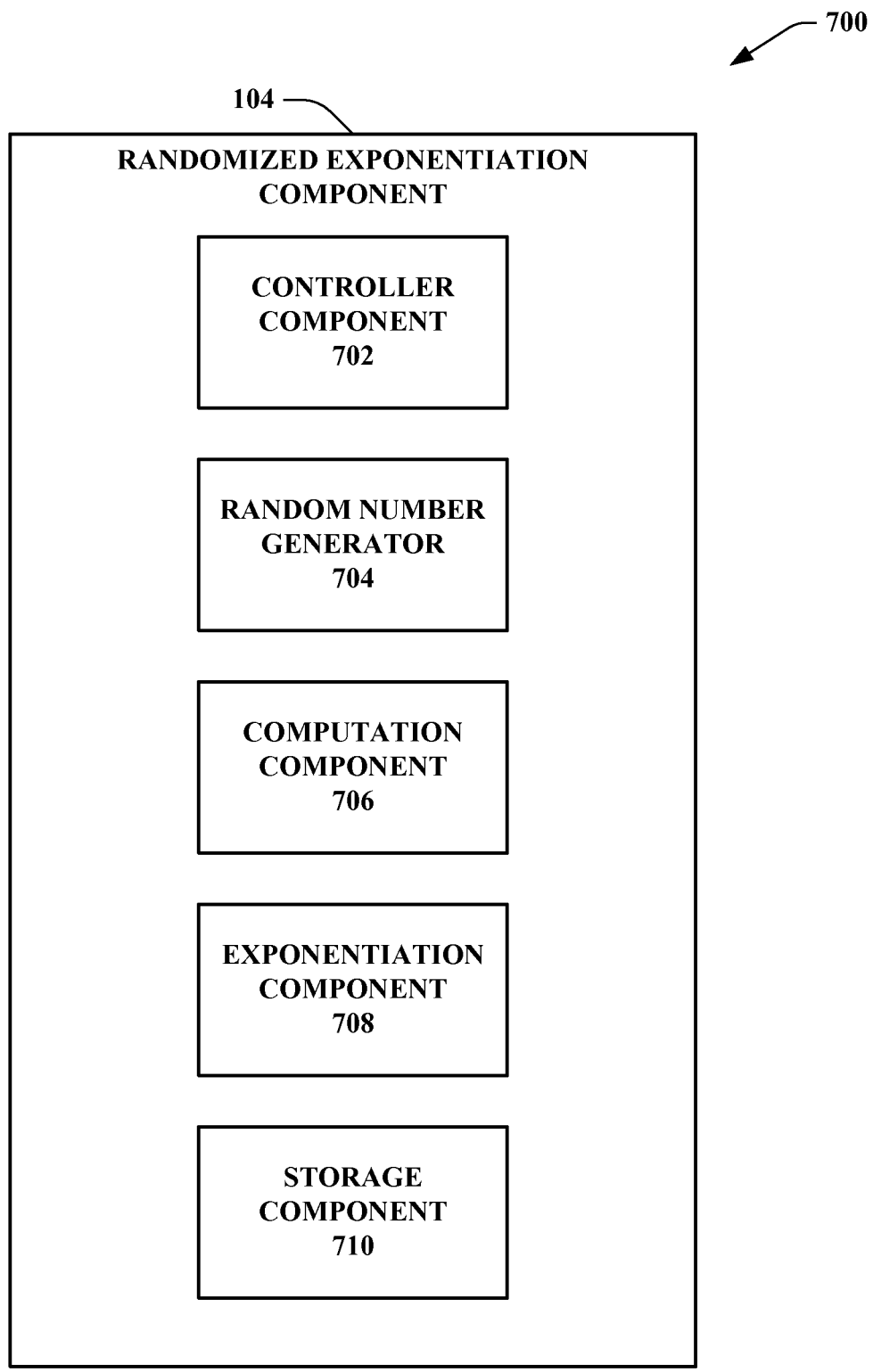
FIG. 7 illustrates a block diagram of a randomized exponentiation component in accordance with an aspect of the subject matter disclosed herein.

Turning to FIG. 7, illustrated is a block diagram of a system 700 that employs a randomized exponentiation component 104 to facilitate exponentiation randomization to facilitate securing data in accordance with the disclosed subject matter. The randomized exponentiation component 104 can include such functionality as described herein, for example, with regard to system 100 and/or system 600, and/or diagrams 200, 300, 400, and/or 500. Randomized exponentiation component 104 can include a controller component 702 that can facilitate controlling the execution of exponentiation of exponents as well as controlling the access to data in memory (e.g., 604) (not shown). The controller component 702 can also facilitate selecting the type of exponentiation to be performed.

In accordance with an aspect of the disclosed subject matter, different types of exponentiation (e.g. left-to-right, Russian Peasant) can be performed in an independent manner. The controller component 702 can facilitate interleaving the respective exponentiations such that a predetermined number of iterations can be performed with regard to a first type of exponentiation on a first vector (e.g., subexponent), with the partial results of the exponentiation stored, and then a predetermined number of iterations can be performed with regard to a second type of exponentiation on a second vector, with the partial results of such exponentiation stored, and continuing to alternate between the different types of exponentiations until a final result is obtained. The controller component 702 can also employ additional interleaving techniques, as more fully described herein, for example, with regard to system 100 and/or diagram 400.

Randomized exponentiation component 104 can also include a random number generator 704 that can facilitate generating a random number(s) that can be utilized to determine the point (e.g. bit) in an exponent where the exponent can be divided into vectors. For example, the random number generator 704 can generate a random number between 0 and m−1, where the exponent is comprised of m bits. The random number can be different each time an exponentiation is performed. In accordance with one aspect of the disclosed subject matter, the random number generator 704 can be a true random number generator that can generate a random number in a secure manner to reduce or minimize discovery of the random number by an attacker. The random number generator 704 can further facilitate generating other random numbers that can be utilized by the randomized exponentiation component 104, the cryptographic component 102, and/or other components to facilitate performing other functions, such as performing exponentiations in an interleaved manner.

Randomized exponentiation component 104 can further include a computation component 706 that can perform calculations associated with exponentiation of data (e.g., exponent) to facilitate decrypting data and/or generating a digital signature based on the type of exponentiation(s) being performed. For example, the computation component 706 can be a modular multiplication/exponentiation accelerator. In accordance with one aspect of the disclosed subject matter, the computation component 706 can be comprised of one or more computation subcomponents such that there can be more than one multiply-accumulate unit that can perform calculations associated with exponentiation of an exponent. For example, if two computation subcomponents are employed, exponentiation of two vectors can be performed in parallel, for example, where the first type of exponentiation and the second type of exponentiation can be performed independent of each other. The controller component 702 can facilitate controlling access to memory and data as well as controlling the execution of the exponentiations. Performing the exponentiations in parallel can be an effective countermeasure, as the risk of a side-channel or other attack can be reduced or minimized because such parallel operations can make it difficult to obtain sufficient power analysis information or other information (e.g., electromagnetic information, fault information). In addition, parallel operations can result in exponentiations being performed in a more time-efficient manner.

The randomized exponentiation component 104 can include an exponentiation component 708 that can be comprised of respective pieces of code that can each be utilized to facilitate performing respective types of exponentiation. By way of example, and not limitation, the types of exponentiation that can be performed include left-to-right exponentiation, right-to-left (e.g., Russian Peasant) exponentiation, atomic left-to-right exponentiation, atomic Russian Peasant exponentiation, high radix (e.g., radix 4) left-to-right odd powers only exponentiation, and/or the Montgomery Power Ladder exponentiation. The pieces of code can be stored in storage component 710, for example.

Randomized exponentiation component 104 can further include a storage component 710 that can be comprised of volatile memory (e.g. RAM) and non-volatile memory (e.g., ROM). For example, the volatile memory of storage component 710 can be utilized to store exponent values, initial variable values, random number values, and/or temporary, partial, and/or final results of calculations associated with exponentiation of exponents, decryption of data, and/or generation of a digital signature. As further example, the non-volatile memory of the storage component 710 can be utilized to store pieces of code respectively associated with the different types of exponentiation that can be performed in accordance with the disclosed subject matter.

Figure 8:
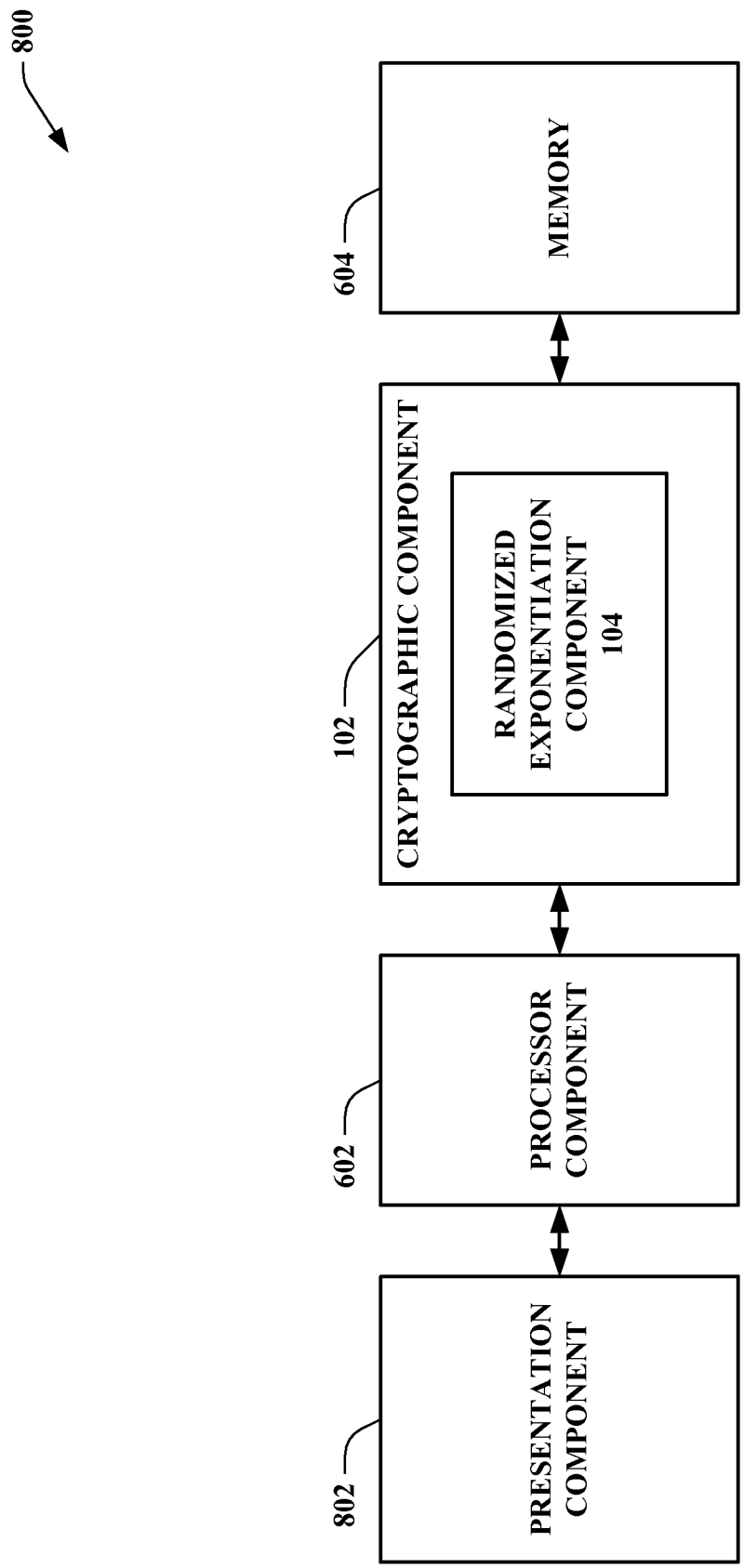
FIG. 8 illustrates a block diagram of a system that facilitates secure electronic communication of data in accordance with an embodiment of the subject matter disclosed herein.

Referring to FIG. 8, depicted is a system 800 that facilitates securing data and/or generating digital signatures in accordance with the disclosed subject matter. System 800 can include a host processor 602, cryptographic component 102, randomized exponentiation component 104, and memory 604 that each can be substantially similar to respective components and can include such respective functionality as described herein, for example, with regard to system 100, system 600, and/or system 700, and/or diagrams, 200, 300, 400, and/or 500.

Host processor 602 can be associated with a presentation component 802 that provides various types of user interfaces to facilitate interaction between a user and any component coupled to the host processor 602. As depicted, the presentation component 802 is a separate entity that can be utilized with the host processor 602 and associated components. However, it is to be appreciated that the presentation component 802 and/or similar view components can be incorporated into the host processor 602 and/or a stand-alone unit. The presentation component 802 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to and/or incorporated into the host processor 602.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Further, the presentation component 802 can include or can be associated with a scanner that can receive data (e.g., decrypted data, digital signature) from other components (e.g. host processor 602) of system 800. The scanner can be a type whereby a device (e.g. smart card) containing the data can be swiped through the scanner, which can read data associated with the device and/or the scanner can be a wireless scanner (e.g., radio-frequency identification (RFID)-type scanner) that can receive or read data associated with a device that contains the data when the device is within a predefined area near the wireless scanner such that the wireless scanner is able to communicate with the device to read or receive the data from the device.

System 100, system 600, system 700, and/or system 800, or portions thereof, can be employed in virtually any electronic device where security of data is desired. Examples of such electronic devices can include a computer, a cellular phone, a digital phone, a video device (e.g., video playing and/or recording device), a smart card, a personal digital assistant (PDA), a television, an electronic game (e.g. video game), a digital camera, an electronic organizer, an audio player and/or recorder, an electronic device associated with digital rights management, Personal Computer Memory Card International Association (PCMCIA) cards, trusted platform modules (TPMs), Hardware Security Modules (HSMs), set-top boxes, secure portable tokens, Universal Serial Bus (USB) tokens, key tokens, secure memory devices with computational capabilities, devices with tamper-resistant chips, and the like.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 9-12 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 9:
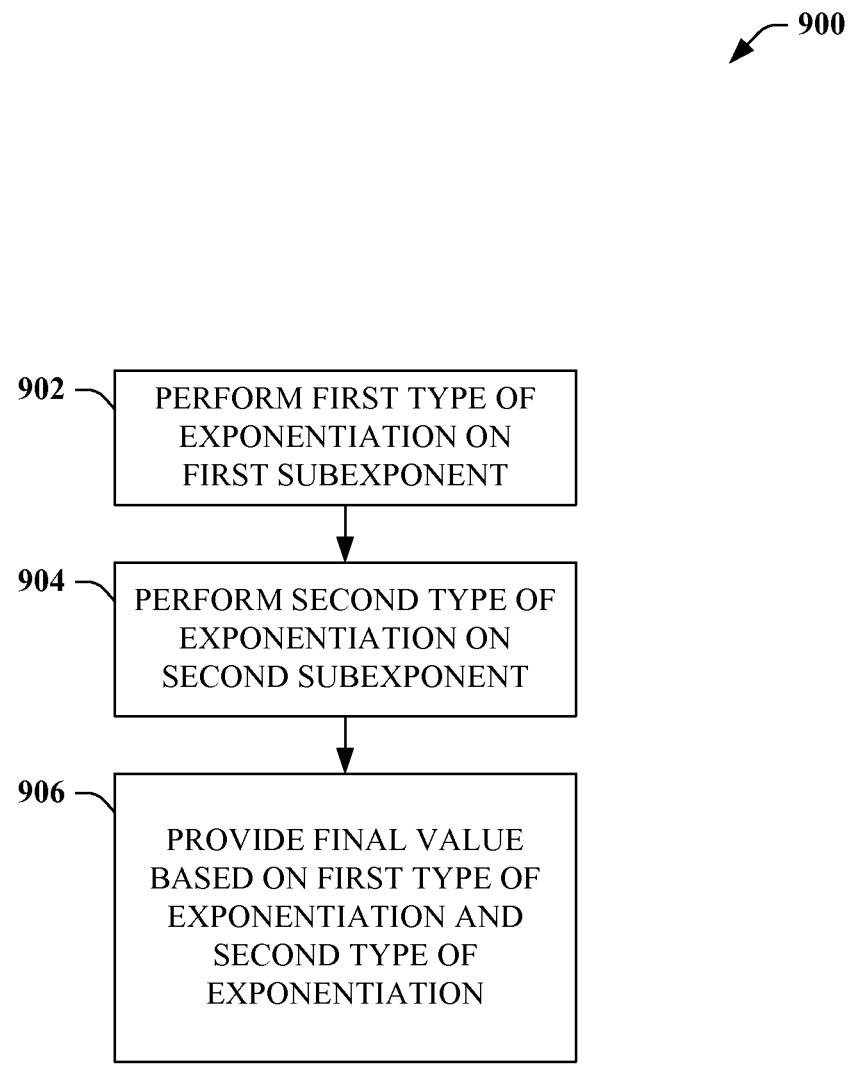
FIG. 9 illustrates a methodology that employs randomized exponentiation to facilitate secure electronic communication of data in accordance with an aspect of the disclosed subject matter.

Referring to FIG. 9, a methodology 900 that facilitates modular exponentiation of data is illustrated. In accordance with one embodiment of the disclosed subject matter, Binary Random Exponent Splitting Combinational Algorithm can be employed. In accordance with another embodiment of the disclosed subject matter, Binary Random Exponent Splitting Interleaved Algorithm can be employed. The exponentiation can be with regard to a message g that can be associated with an m-bit exponent d that can be in binary form. The exponent can be divided into two vectors at $bit_k$ based on a random number k, where one vector can include bits from $bit_0$ to $bit_{k-1}$, and the other vector can include bits from $bit_k$ to $bit_{m-1}$, for example.

At 902, a first type of exponentiation can be performed on a first vector associated with an exponent and/or message. For example, the first type of exponentiation that can be performed can be left-to-right exponentiation, or an atomic version thereof, and can also be performed utilizing a Montgomery Power Ladder technique.

At 904, a second type of exponentiation can be performed on a second vector associated with an exponent and/or message. For example, the second type of exponentiation that can be performed can be a Russian Peasant exponentiation, or an atomic version thereof.

At 906, a final value based on the first type of exponentiation and the second type of exponentiation can be provided as an output. For example, the final value can be equal to $g^d$, where the input comprises the message g and the exponent d. The final value can be decrypted data, a digital signature associated with a user, and/or other output associated with a cryptographic protocol, for example. At this point, methodology 900 can end.

Figure 10:
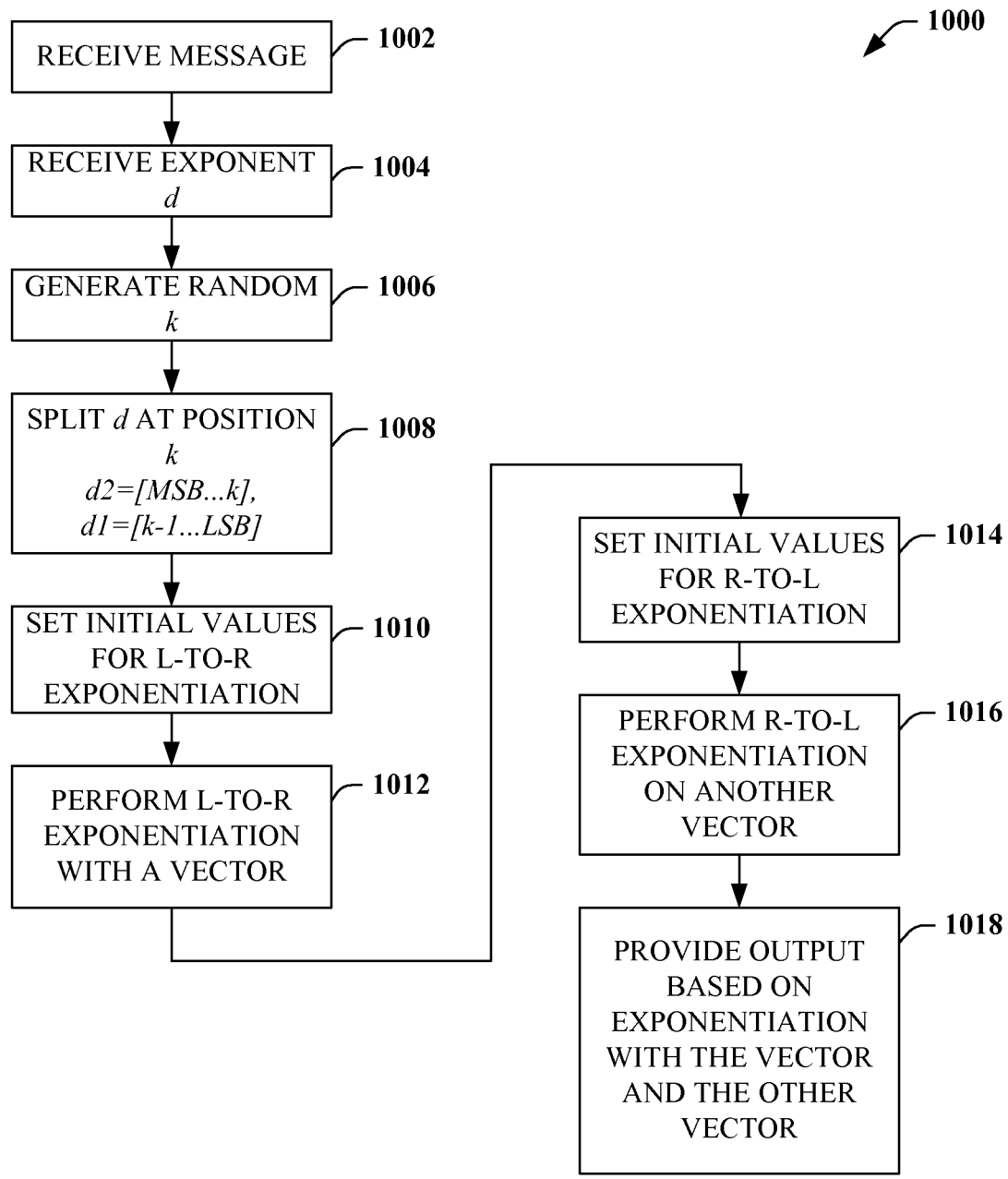
FIG. 10 illustrates a methodology that employs randomized exponentiation to facilitate secure electronic communication of data in accordance with an aspect of the disclosed subject matter.

Referring to FIG. 10, a methodology 1000 that facilitates modular exponentiation of data is depicted. At 1002, a message g can be received, where the message can be in the form of binary data, for example. At 1004, an exponent d that can be associated with the message can be received. The exponent can be comprised of m bits (e.g. 1024 bits, 2048 bits, . . . ), for example. At 1006, a random number can be generated, where the random number can be a number between 0 and m−1. At 1008, the exponent d can be split into two vectors at the bit positioned in the exponent corresponding to the random number k. For example, if the random number k is 12, then the exponent d can be split at $bit_{12}$. The exponent d can be split at position k into two vectors, d1 and d2, where d2= [d(MSB), . . . , d(k)] and d1=[(d(k−1), . . . , d(LSB)].

At 1010, initial values can be set or selected to facilitate performing a left-to-right exponentiation on the one of the vectors. For example, if the Binary Random Exponent Splitting Combinational Algorithm is employed, a left-to-right exponentiation can be performed on the message utilizing vector d2; alternatively, if the Binary Random Exponent Splitting Interleaved Algorithm is employed, a left-to-right exponentiation can be performed on the message utilizing vector d1. At 1012, a left-to-right exponentiation of the message data using the desired vector can be performed.

At 1014, initial values can be set or selected to facilitate performing a right-to-left exponentiation on a message with the other vector. For example, if the Binary Random Exponent Splitting Combinational Algorithm is employed, a right-to-left exponentiation can be performed on the message utilizing vector d1; alternatively, if the Binary Random Exponent Splitting Interleaved Algorithm is employed, a right-to-left exponentiation can be performed on the message utilizing vector d2. At 1016, a right-to-left exponentiation of the message data using the desired vector can be performed. At 1018, an output can be provided, where the output can be based on the results of the left-to-right exponentiation of vector d2 and the results of the right-to-left exponentiation of vector d1. For instance, the output can have a value of $g^d$, which can be the decrypted message, a digital signature, and/or other output associated with a cryptographic protocol. At this point, methodology 1000 can end.

For example, in accordance with methodology 1000, when the Binary Random Exponent Splitting Combinational Algorithm is employed by the randomized exponentiation component 104, at 1002, a message g can be received. At 1004, an exponent d can be received, where the exponent can have m-bits and can be associated with the message. At 1006, a random number k can be generated, where the random number k can be a number between 0 and m−1. At 1008, the exponent d can be split into two vectors at the $bit_k$. The exponent d can be split at position k into two vectors, d1 and d2, where d2=[d(MSB), . . . , d(k)] and d1=[(d(k−1), . . . , d(LSB)].

At 1010, initial values can be set or selected to facilitate performing a left-to-right exponentiation on the message utilizing vector d2. At 1012, a left-to-right exponentiation of the message data using the vector d2 can be performed by scanning each exponent bit from $bit_k$ outward to $bit_{m-1}$ of vector d2. At 1014, initial values can be set or selected to facilitate performing a right-to-left exponentiation. At 1016, a right-to-left exponentiation of the message data using the vector d1 can be performed by scanning each exponent bit from $bit_{k-1}$ outward to $bit_0$ of vector d1. At 1018, an output can be provided, where the output can be based on the results of the left-to-right exponentiation of vector d2 and the results of the right-to-left exponentiation of vector d1. For example, the output can have a value of $g^d$, which can be the decrypted message, a digital signature, and/or other output associated with a cryptographic protocol.

As another example, in accordance with methodology 1000, when the Binary Random Exponent Splitting Interleaved Algorithm is employed by the randomized exponentiation component 104, at 1002, a message g can be received. At 1004, an exponent d can be received, where the exponent can have m-bits and can be associated with the message. At 1006, a random number k can be generated, where the random number k can be a number between 0 and m−1. At 1008, the exponent d can be split into two vectors, d1 and d2, at the $bit_k$, where d2=[d(MSB), . . . , d(k)] and d1=[(d(k−1), . . . , d(LSB)].

At 1010, initial values can be set or selected to facilitate performing a left-to-right exponentiation on the message utilizing vector d1. At 1012, a left-to-right exponentiation of the message data using the vector d can be performed by scanning each exponent bit from $bit_0$ to $bit_{k-1}$ of vector d1. At 1014, initial values can be set or selected to facilitate performing a right-to-left exponentiation. At 1016, a right-to-left exponentiation of the message data using the vector d2 can be performed by scanning each exponent bit from $bit_{m-1}$ to $bit_k$ of vector d2. At 1018, an output can be provided, where the output can be based on the results of the left-to-right exponentiation of vector d2 and the results of the right-to-left exponentiation of vector d1. For instance, the results of the left-to-right exponentiation of the data can be combined with the results of the right-to-left exponentiation of the data to yield a final result, which can be the output. The output can have a value of $g^d$, which can be the decrypted message, a digital signature, and/or other output associated with a cryptographic protocol.

Figure 11:
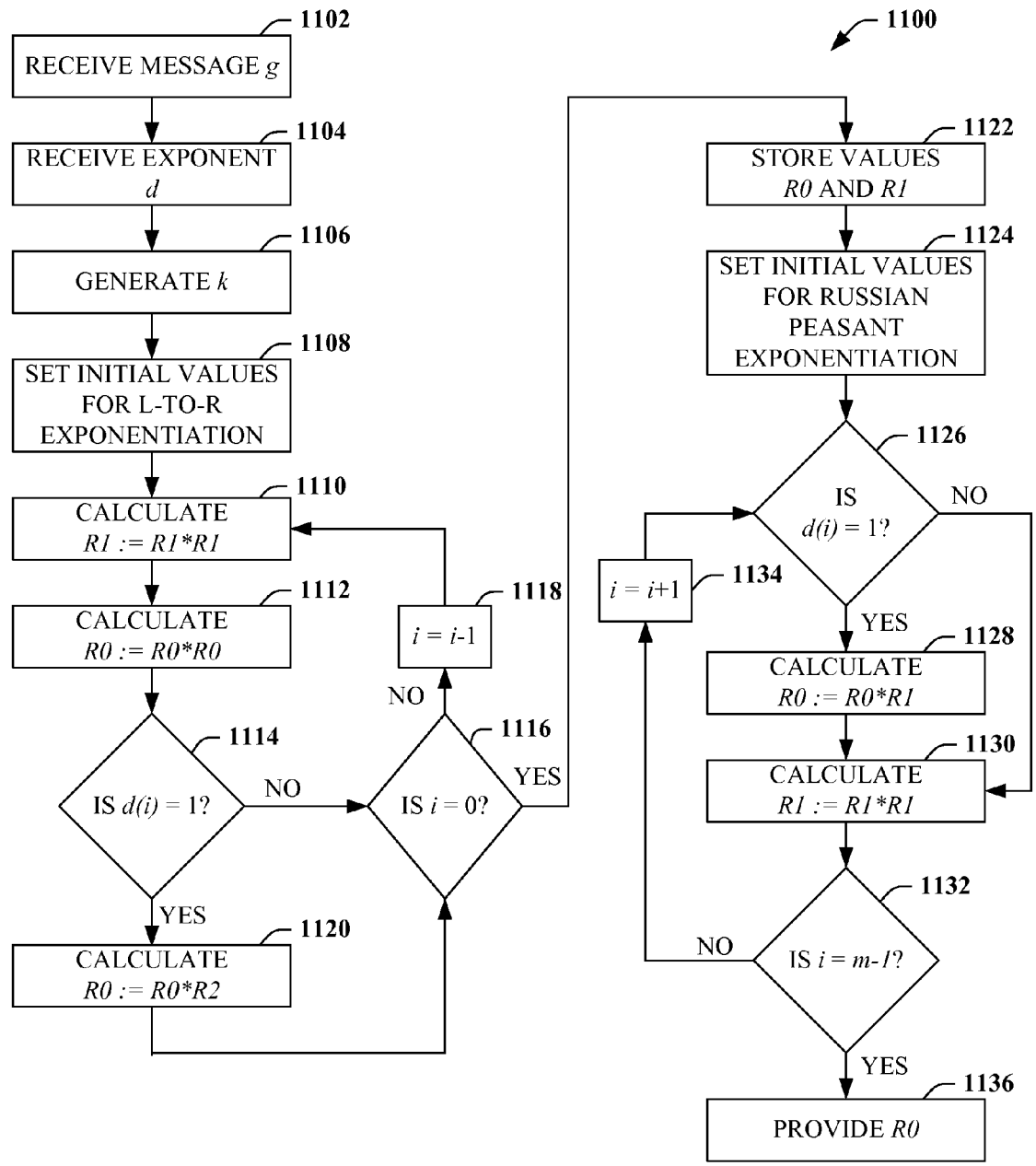
FIG. 11 illustrates a methodology that employs randomized exponentiation to facilitate secure electronic communication of data in accordance with one embodiment of the subject matter disclosed herein.

Turning to FIG. 11, a methodology 1100 that facilitates modular exponentiation of data is illustrated. At 1102, a message can be received, where the message can be in the form of binary data, for example. At 1104, an exponent d that can be associated with the message can be received. The exponent can be comprised of m bits (e.g. 1024 bits, 2048 bits, . . . ), for example. At 1106, a random number can be generated, where the random number can be a number between 0 and m−1. At 1108, initial values can be set or selected to facilitate performing a left-to-right exponentiation on the first vector (e.g., subexponent) from $bit_{k-1}$ down to $bit_0$. For example, the initial values for certain variables can be R0:=1, R1:=g, R2:=g, and i=k−1.

At 1110, a temporary value R1 can be calculated, for example, by calculating R1:=R1*R1. At 1112, a value for accumulator R0, which can be an intermediate result variable, can be calculated, for example, by calculating R0:=R0*R0. At 1114, a determination can be made as to whether the portion of the exponent at the value of the exponent bit for the current iteration is a 0 or 1, that is, a determination can be made as to whether d(i)=1. If the exponent bit is a 0, at 1116, a determination can be made as to whether the iteration number i=0. If it is determined that the iteration number i is not equal to 0, then at 1118, the iteration number i can be decremented by 1, that is, i=i−1, and methodology 1100 can be returned to reference numeral 1110.

Turning back to reference numeral 1114, if a determination is made that the exponent bit is a 1, then at 1120, a new accumulator R0 can be calculated as R0:=R0*R2. Then, returning back to 1116, a determination can be made as to whether the iteration number i=0. If it is determined that the iteration number i is not equal to 0, then at 1118, the iteration number i can be decremented by 1, and methodology 1100 can be returned to reference numeral 1110.

If, however, at 1116, it is determined that the iteration number i=0, then, at 1122, the temporary values R1 and R0 can be stored, for example, in a storage component 310 (e.g., RAM). The left-to-right exponentiation is complete.

At 1124, initial values can be set or selected to facilitate performing a Russian Peasant exponentiation on the second vector from $bit_k$ to $bit_{m-1}$. For example, the initial values for R0 and R1 can be the respective stored values from the left-to-right exponentiation, and i=k. At 1126, a determination can be made as to whether the portion of the exponent at the value of the exponent bit for the current iteration is a 0 or 1, that is, a determination can be made as to whether d(i)=1. If the exponent bit is a 1, at 1128, R0 can be calculated as R0:=R0*R1. At 1130, R1 can be calculated as R1:=R1*R1. Referring back to reference numeral 1126, if it is determined that d(i)=0, then methodology 1100 can proceed to reference numeral 1130, where R1 can be calculated as R1:=R1*R1.

At 1132, a determination can be made as to whether the iteration number i=m−1. If it is determined that the iteration number i is not equal to m−1, then at 1134, the iteration number i can be incremented by 1, that is, i=i+1, and methodology 1100 can be returned to reference numeral 1126. If, at 1132, it is determined that i=m−1, the Russian Peasant exponentiation is complete, and then, at 1136, an output can be provided, where the output can be the value of R0. The output value of R0 can be $g^d$, which can be the decrypted data, a digital signature, and/or other output associated with a cryptographic protocol, for example. At this point, methodology 1100 can end.

Figure 12:
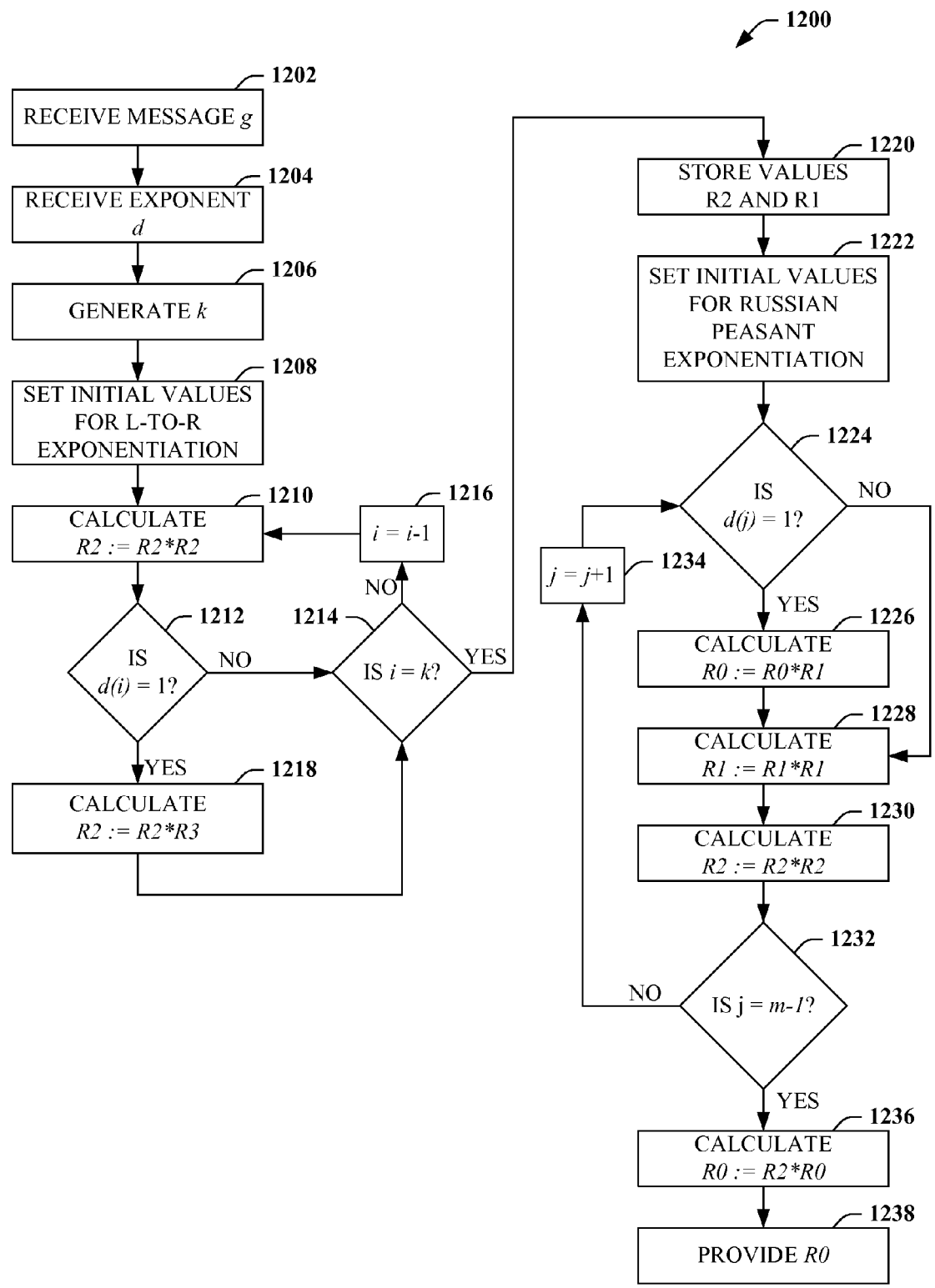
FIG. 12 illustrates a methodology that employs randomized exponentiation to facilitate secure electronic communication of data in accordance with another embodiment of the disclosed subject matter.

Referring to FIG. 12, illustrated is another methodology 1200 that facilitates modular exponentiation of data. At 1202, a message g can be received, where the message can be in the form of binary data, for example. At 1204, an exponent d that can be associated with the message can be received. The exponent can be comprised of m bits (e.g., 1024 bits, 2048 bits, . . . ), for example. At 1206, a random number k can be generated, where the random number k can be a number between 0 and m−1.

At 1208, initial values can be set or selected to facilitate performing a left-to-right exponentiation on the second vector from $bit_{m-1}$ down to $bit_k$. For example, initial values for certain variables can be set as R2:=1, R3:=g, and i=m−1. At 1210, R2 can be calculated, for example, by calculating R2:=R2*R2. At 1212, a determination can be made as to whether the portion of the exponent at the value of the exponent bit for the current iteration is a 0 or 1, that is, a determination can be made as to whether d(i)=1. If the exponent bit is a 0, at 1214, a determination can be made as to whether the iteration number i=k. If it is determined that the iteration number i is not equal to k, then at 1216, the iteration number i can be decremented by 1, that is i=i−1, and methodology 1200 can be returned to reference numeral 1210.

Turning back to reference numeral 1212, if a determination is made that the exponent bit is a 1, then at 1218, a new R2 can be calculated as R2:=R2*R3. Then, returning back to 1214, a determination can be made as to whether the iteration number i=k. If it is determined that the iteration number i is not equal to k, then at 1216, the iteration number i can be decremented by 1, and methodology 1200 can be returned to reference numeral 1210.

If, however, at 1214, it is determined that the iteration number i=k, then, at 1220, the temporary value of R2 can be stored, for example, in a storage component 310 (e.g., RAM). The left-to-right exponentiation is complete.

At 1222, initial values can be set or selected to facilitate performing a Russian Peasant exponentiation on the first vector from $bit_0$ to $bit_{k-1}$. For example, initial values for certain variables can be set as R0=1, R1=g, and j=0.

At 1224, a determination can be made as to whether the portion of the exponent at the value of the exponent bit for the current iteration is a 0 or 1, that is, a determination can be made as to whether d(j)=1. If the value of the exponent bit is a 1, at 1226, R0 can be calculated as R0:=R0*R1. At 1228, R1 can be calculated as R1:=R1*R1. Referring back to reference numeral 1224, if it is determined that d(j)=0, then methodology 1200 can proceed to reference numeral 1228, where R1 can be calculated as R1:=R1*R1.

At 1230, R2 can be calculated, for example, as R2:=R2*R2. At 1232, a determination can be made as to whether the iteration number j=k−1. If it is determined that the iteration number j is not equal to k−1, then at 1234, the iteration number k can be incremented by 1, that is, j=j+1, and methodology 1200 can be returned to reference numeral 1224. If, at 1232, it is determined that j=k−1, the Russian Peasant exponentiation is complete. At 1236, the results of the left-to-right exponentiation and the Russian Peasant exponentiation can be combined, for example, such that R0:=R2*R0. At 1238, an output can be provided, where the output can be the value of R0. The output value of R0 can be $g^d$, which can be decrypted data, a digital signature, and/or other output associated with a cryptographic protocol, for example. At this point, methodology 1200 can end.

As utilized herein, terms "component," "system," "interface," and the like, are intended to refer to a computer-related entity, either hardware, software (e.g. in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 13:
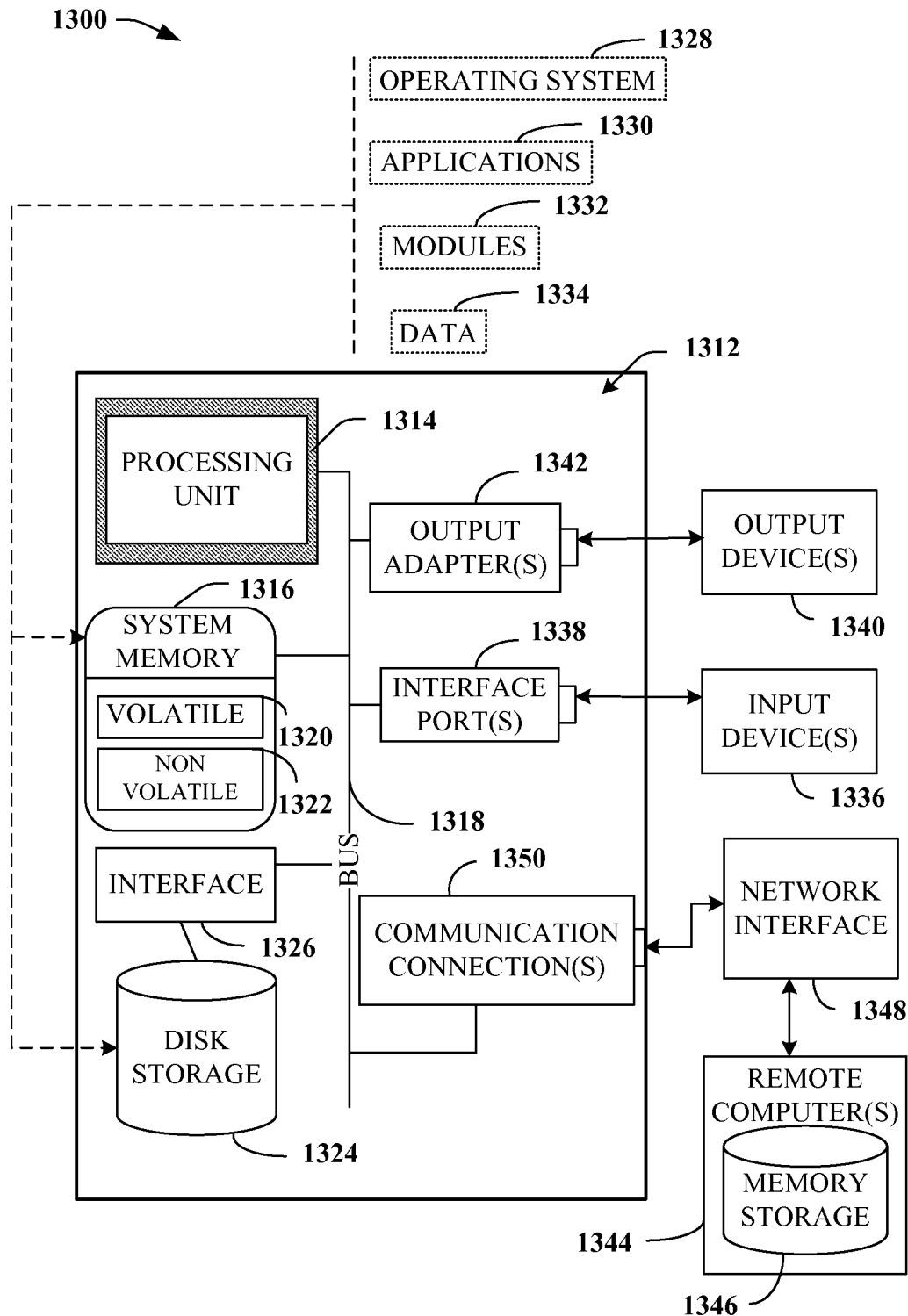
FIG. 13 is a schematic block diagram illustrating a suitable operating environment.
Figure 14:
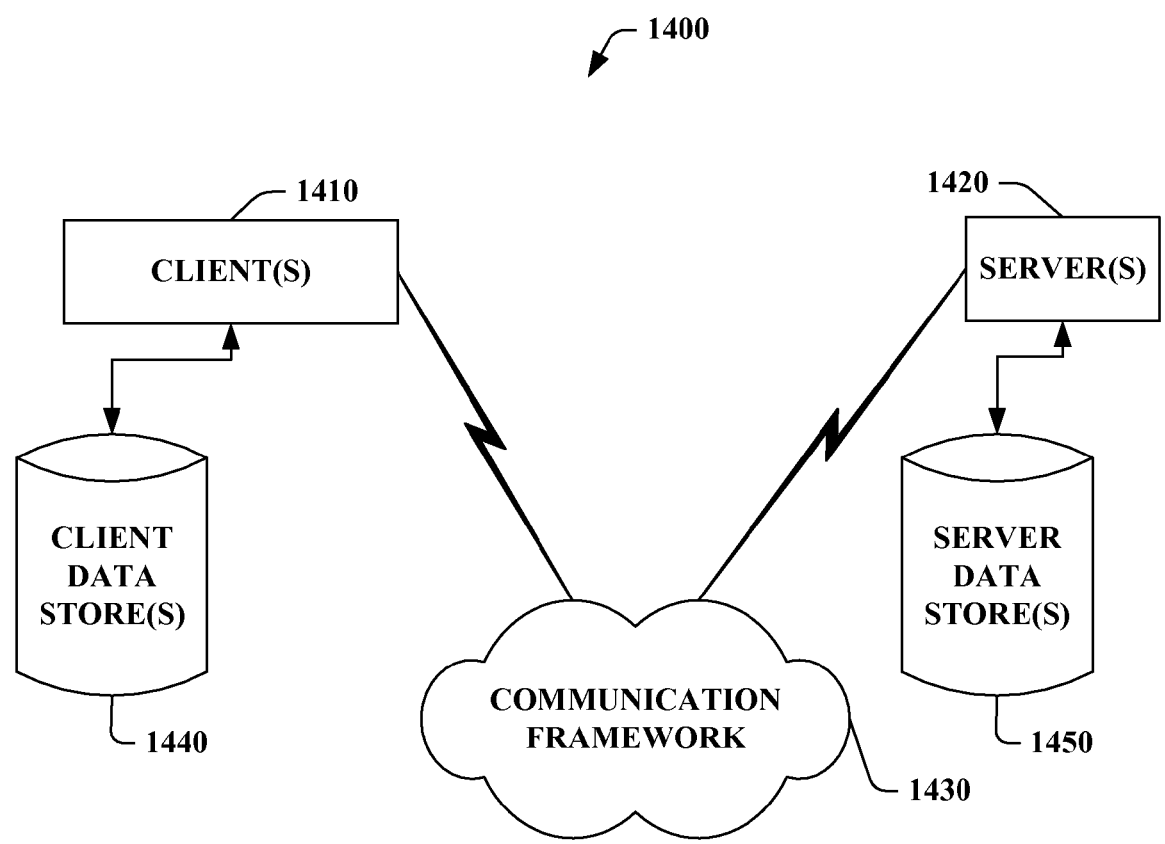
FIG. 14 is a schematic block diagram of a sample-computing environment.

In order to provide a context for the various aspects of the disclosed subject matter, FIGS. 13 and 14 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 13, a suitable environment 1300 for implementing various aspects of the claimed subject matter includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include ROM, PROM, EPROM, EEPROM, or flash memory. Volatile memory 1320 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ES-DRAM), Synchlink DRAM (SLDRAM), Rambus direct RAM (RDRAM), direct Rambus dynamic RAM (DRDRAM), and Rambus dynamic RAM (RDRAM).

Computer 1312 also includes removable/non-removable, volatile/non-volatile computer storage media. FIG. 13 illustrates, for example, a disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used, such as interface 1326.

It is to be appreciated that FIG. 13 describes software that acts as an intermediary between users and the basic computer resources described in the suitable operating environment 1300. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the disclosed subject matter can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

FIG. 14 is a schematic block diagram of a sample-computing environment 1400 with which the subject innovation can interact. The system 1400 includes one or more client(s) 1410. The client(s) 1410 can be hardware and/or software (e.g., threads, processes, computing devices). The system 1400 also includes one or more server(s) 1420. Thus, system 1400 can correspond to a two-tier client server model or a multi-tier model (e.g., client, middle tier server, data server), amongst other models. The server(s) 1420 can also be hardware and/or software (e.g., threads, processes, computing devices). The servers 1420 can house threads to perform transformations by employing the subject innovation, for example. One possible communication between a client 1410 and a server 1420 may be in the form of a data packet transmitted between two or more computer processes.

The system 1400 includes a communication framework 1430 that can be employed to facilitate communications between the client(s) 1410 and the server(s) 1420. The client(s) 1410 are operatively connected to one or more client data store(s) 1440 that can be employed to store information local to the client(s) 1410. Similarly, the server(s) 1420 are operatively connected to one or more server data store(s) 1450 that can be employed to store information local to the server(s) 1420.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system, comprising:
a host hardware processor;
a memory communicatively coupled to the processor, the memory having stored therein computer-executable instructions configured to implement:
a cryptographic component that facilitates encryption and decryption of a data;
a randomized exponentiation component embedded in the cryptographic component, the randomized exponentiation component is configured to:
generate a first random number that corresponds to a bit number associated with an exponent associated with the data;
divide the exponent associated with data into two vectors, a first subexponent and a second subexponent, based on the first random number;
exponentiate the first subexponent associated with the exponent based on a first type of exponentiation algorithm;
initiate values for a second type of exponentiation based on an intermediate value related to the first type of exponentiation;

exponentiate the second subexponent associated with the exponent based on a second type of exponentiation algorithm;
generate a second random number;
alternate between:
- execution of the first type of exponentiation for a number of iterations equal to the second random number and storing of the partial result related to the first type of exponentiation;
- execution of the second type of exponentiation for a number of iterations equal to the second random number and storing a partial result related to the second type of exponentiation;
- generate a final result by combining the partial result related to the first type of exponentiation and the partial result related to the second type of exponentiation; and
- secure the data in accordance with a cryptographic protocol based on at least one of an exponentiation or an elliptic curve point multiplication associated with the data through use of an exponent.

2. The system of claim 1, the randomized exponentiation component divides the exponent into the first vector and the second vector, wherein the first vector comprises the least significant bit to the first random number bit, and the second vector comprises a bit following the random number bit to the most significant bit.

3. The system of claim 1, the randomized exponentiation component:
receives the data and the associated exponent, performs the first type of exponentiation on the data with the first vector based on a scan of bits of the first vector from an exponent bit preceding an exponent bit corresponding to the first random number down to a least significant bit of the exponent, the first type of exponentiation is based on an algorithm that scans exponent bits from left to right; and
performs the second type of exponentiation on the data with the second vector based on a scan of bits of the second vector from an exponent bit corresponding to the first random number up to a most significant bit of the exponent, the second type of exponentiation is based on an algorithm that scans the data from right to left.

4. The system of claim 1, the randomized exponentiation component:
receives the data and the associated exponent, performs the first type of exponentiation on the data with the second vector based on a scan of bits of the second vector from a most significant bit of the exponent down to an exponent bit corresponding to the first random number, the first type of exponentiation is based on an algorithm that scans exponent bits from left to right; and
performs the second type of exponentiation on the data with the first vector based on a scan of bits of the first vector from a least significant bit of the exponent up to an exponent bit preceding an exponent bit corresponding to the first random number, the second type of exponentiation is based on an algorithm that scans the data from right to left.

5. The system of claim 1, the exponent is associated with one of RSA cryptography, elliptic curve cryptography, Diffie-Hellman cryptography, Digital Signature Algorithm (DSA) cryptography, or Elliptic Curve DSA cryptography.

6. The system of claim 1, wherein an electronic device is used within the system, the electronic device is one of a computer, a cellular phone, a digital phone, a video device, a smart card, a personal digital assistant, a television, an electronic game, a digital camera, an electronic organizer, an audio player, an audio recorder, an electronic device associated with digital rights management, Personal Computer Memory Card International Association (PCMCIA) cards, trusted platform modules (TPMs), Hardware Security Modules (HSMs), set-top boxes, secure portable tokens, Universal Serial Bus (USB) tokens, key tokens, secure memory devices with computational capabilities, or electronic devices with tamper-resistant chips.

7. A method for executing a cryptographic modular exponentiation program in an electronic device, the method comprising:
employing a processor to perform computer-executable acts comprising:
- generating a first random number that corresponds to a bit number associated with an exponent;
- dividing the exponent associated with data into two vectors, a first subexponent and a second subexponent, based on the first random number;
- exponentiating the first subexponent associated with the exponent based on a first type of exponentiation algorithm, the exponent is associated with the data;
- initiating values for a second type of exponentiation based on an intermediate value related to the first type of exponentiation;
- exponentiating the second subexponent associated with the exponent based on a second type of exponentiation algorithm;
- generating a second random number;
- alternating between:
  - execution of the first type of exponentiation for a number of iterations equal to the second random number and storing of the partial result related to the first type of exponentiation; and
  - execution of the second type of exponentiation for a number of iterations equal to the second random number and storing a partial result related to the second type of exponentiation; and
- generating a final result by combining the partial result related to the first type of exponentiation and the partial result related to the second type of exponentiation.

8. The method of claim 7, further comprising:
setting initial values for variables associated with the first type of exponentiation.

9. The method of claim 7, further comprising:
scanning the bits of the first subexponent during exponentiation from the bit preceding an exponent bit corresponding with the first random number down to a least significant bit of the exponent; and
calculating the intermediate value based on the first type of exponentiation algorithm, the first type of exponentiation algorithm is based on the left-to-right square-and-multiply type of exponentiation algorithm.

10. The method of claim 9, further comprising:
wherein the second type of exponentiation is based on a right-to-left square-and-multiply type of exponentiation algorithm; and
scanning the bits of the second subexponent during exponentiation from the exponent bit corresponding with the first random number to a most significant bit of the exponent.

11. The method of claim 7, further comprising:
scanning the bits of the first subexponent during exponentiation from a most significant bit down to an exponent bit corresponding with the first random number; and calculating a set of intermediate values based on the first type of exponentiation algorithm, the first type of exponentiation algorithm is based on the left-to-right square-and-multiply type of exponentiation algorithm.

12. The method of claim 11, further comprising:
setting initial values associated with the second type of exponentiation, the second type of exponentiation is based on a right-to-left square-and-multiply type of exponentiation algorithm;
scanning the bits of the second subexponent during the second type of exponentiation from a least significant bit of the exponent to the exponent bit corresponding with the first random number;
calculating another set of intermediate values based on the second type of exponentiation algorithm; and
generating the final result by calculating a final value based on the set of intermediate values and the other set of intermediate values, the final value is the value of the output.

13. The method of claim 11, further comprising:
interleaving the exponentiation of the first subexponent and the exponentiation of the subexponent by performing at least one of a dynamically determined number of iterations of each of the first type of exponentiation and the second type of exponentiation and alternating between each type of exponentiation.

14. A non-transitory computer-readable storage medium having stored thereon, computer-executable instructions that, in response to execution by a computing device, cause the computing device to perform operations comprising:
generating a first random number and a second random number;
receiving data;
dividing an exponent associated with the data into at least two vectors, a first subexponent and at least one other subexponent, based on the first random number that corresponds to a position of a bit of the exponent;
performing at least one exponentiation on at least one of the at least two vectors, to obtain a partial result;
initiating values for exponentiation of a disparate vector of the at least two vectors based on the partial result, wherein the disparate vector is disparate from the at least one of the at least two vectors utilized to obtain the partial result;
performing an execution in parallel of:
exponentiating the first subexponent associated with the exponent based on a first type of exponentiation for a number of times equal to the second random number;
exponentiating the at least one other subexponent associated with the exponent based on at least one other type of exponentiation for a number of times equal to the second random number; and
providing a final data value based on the first type of exponentiation and the at least one other type of exponentiation.

15. The non-transitory tangible computer-readable storage medium according to claim 14, having stored thereon, computer-executable instructions that, in response to execution by a computing device, cause the computing device to perform interleaved operations further comprising:
performing a number of iterations of computations associated with the first type of exponentiation, the first type of exponentiation is based on a left-to-right square-and-multiply type of exponentiation algorithm;
performing a number of iterations of computations associated with the second type of exponentiation, the second type of exponentiation is based on a right-to-left square-and-multiply type of exponentiation algorithm; and
alternating between performing the respective exponentiations until the final result is reached.

16. The non-transitory computer-readable storage medium according to claim 14, having stored thereon, computer-executable instructions that, in response to execution by a computing device, cause the computing device to perform parallel operations further comprising:
performing computations associated with the first type of exponentiation, the first type of exponentiation is based on a left-to-right square-and-multiply type of exponentiation algorithm; and
performing computations associated with the second type of exponentiation, the second type of exponentiation is based on a right-to-left square-and-multiply type of exponentiation algorithm.

17. The non-transitory computer-readable storage medium according to claim 14, wherein the random number corresponds to a bit number associated with the exponent, the exponent is associated with one of RSA cryptography, elliptic curve cryptography, Diffie-Hellman cryptography, Digital Signature Algorithm (DSA) cryptography, or Elliptic Curve DSA cryptography and the exponent is split into a first vector and a second vector.

18. The non-transitory computer-readable storage medium according to claim 17, wherein, the randomized exponentiation component:
receives the data and the associated exponent, performs the first type of exponentiation on the data with the first vector based on a scan of bits of the first vector from an exponent bit preceding an exponent bit corresponding to the first random number down to a least significant bit of the exponent, the first type of exponentiation is based on an algorithm that scans exponent bits from left to right, and performs the second type of exponentiation on the data with the second vector based on a scan of bits of the second vector from an exponent bit corresponding to the first random number up to a most significant bit of the exponent, the second type of exponentiation is based on an algorithm that scans the data from right to left.

19. The non-transitory computer-readable storage medium according to claim 17, wherein, the randomized exponentiation component:
receives the data and the associated exponent, performs the first type of exponentiation on the data with the second vector based on a scan of bits of the second vector from a most significant bit of the exponent down to an exponent bit corresponding to the first random number, the first type of exponentiation is based on an algorithm that scans exponent bits from left to right, and performs the second type of exponentiation on the data with the first vector based on a scan of bits of the first vector from a least significant bit of the exponent up to an exponent bit preceding an exponent bit corresponding to the first random number, the second type of exponentiation is based on an algorithm that scans the data from right to left.

* * * * *